(12) United States Patent
Goovaerts et al.

(10) Patent No.: US 10,730,621 B2
(45) Date of Patent: Aug. 4, 2020

(54) SYSTEM AND METHOD FOR CARGO DELIVERY

(71) Applicant: DRONE-FUTURE BVBA, Zedelgem (BE)

(72) Inventors: Bart Jean Marie Goovaerts, Zedelgem (BE); Ivan Jos Christine Peeters, Beveren (BE); Kris Rottiers, Zemst (BE)

(73) Assignee: DRONE-FUTURE BVBA, Zedelgem (BE)

( * ) Notice: Subject to any disclaimer, the term of this patent is extended or adjusted under 35 U.S.C. 154(b) by 0 days.

(21) Appl. No.: 16/230,195

(22) Filed: Dec. 21, 2018

(65) Prior Publication Data
US 2019/0135433 A1    May 9, 2019

Related U.S. Application Data

(63) Continuation-in-part of application No. PCT/EP2018/065392, filed on Jun. 11, 2018.

(30) Foreign Application Priority Data

Jun. 9, 2017 (EP) ..................... 17175349

(51) Int. Cl.
| | |
|---|---|
| *B64C 39/02* | (2006.01) |
| *A47G 29/14* | (2006.01) |
| *B64D 9/00* | (2006.01) |
| *B64F 1/14* | (2006.01) |
| *B64F 1/30* | (2006.01) |
| *G06Q 10/08* | (2012.01) |

(52) U.S. Cl.
CPC ............ *B64C 39/024* (2013.01); *A47G 29/14* (2013.01); *B64D 9/00* (2013.01); *B64F 1/14* (2013.01); *B64F 1/30* (2013.01); *G06Q 10/083* (2013.01); *B64C 2201/128* (2013.01); *B64C 2201/141* (2013.01)

(58) Field of Classification Search
CPC ............ B64C 39/024; B64C 2201/141; B64C 2201/128; A47G 29/14; B64D 9/00; B64F 1/14; B64F 1/30; G06Q 10/083
USPC ............................................................. 701/3
See application file for complete search history.

(56) References Cited

U.S. PATENT DOCUMENTS

| | | | |
|---|---|---|---|
| 9,959,772 B2* | 5/2018 | Priest ................... | G08G 5/0043 |
| 2015/0336667 A1* | 11/2015 | Srivastava ............ | B64C 39/024 |
| | | | 701/2 |
| 2016/0257423 A1* | 9/2016 | Martin ..................... | B64F 1/00 |

FOREIGN PATENT DOCUMENTS

WO    WO 2017081550    *    5/2017

* cited by examiner

*Primary Examiner* — Muhammad Shafi
(74) *Attorney, Agent, or Firm* — Wenderoth, Lind & Ponack, L.L.P.

(57) ABSTRACT

The current invention concerns an improved system for cargo delivery through (unmanned) aerial vehicles (preferably UAVs or drones) to specifically designed home stations. Additionally, a method is described according to which the system of the invention functions.

34 Claims, 8 Drawing Sheets

SYSTEM AND METHOD FOR CARGO DELIVERY

TECHNICAL FIELD

The invention pertains to the technical field of aerial delivery of cargo and/or passengers at home stations via aerial vehicles, preferably unmanned, and furthermore pertains to an optimized system and method for such deliveries at increased ease and security.

BACKGROUND

There remains a need in the art for an improved delivery system that employs (unmanned) aerial vehicles (preferably UAVs) or drones. In such systems, the delivery locations have a docking system or assembly that allows an aerial vehicle to land with a package and transfer said package to the docking system, which then provides it to the user. Most often, such a docking station is placed in a high location so the aerial vehicle may easily reach it without disturbing the surroundings, and with lower danger for the aerial vehicle itself (less obstacles and/or easier to spot the obstacle and adjust course depending thereon). Once the package is transferred, the drone may take off again, while the docking system handles the package, for instance via a chute or an elevator mechanism to provide it to the user in a convenient location (ground floor, mailbox . . . ).

Such systems are described in a multitude of documents, for instance U.S. Pat. No. 9,387,928, US 2016/159496, US 2016/257423, WO 2014/080389, WO 2017/072101, US 2015/158599, and many more. The first of these documents for instance describes a docking station for drones which is positioned on elevated structures such as poles, which create a network of 'charge points' for longer flights, but may also comprise a cargo retrieval system, which could withdraw the cargo from the drone. The others all describe similar subjects.

The applicant has noticed that all of these systems share a common flaw, namely allowing the better part of the hardware to be exposed to harsh environmental conditions as well as placing it beyond the practical reach of technical professionals (for repair, maintenance, installation . . . ), which greatly increases the difficulty of these operations.

Furthermore, none of the documents discloses a delivery system that is capable of receiving cargo from different types of drones, either having detachable cargo modules, or where the cargo module is inseparable from the aerial vehicle.

The present invention aims to resolve at least some of the problems mentioned above.

SUMMARY OF THE INVENTION

The present invention provides an improved system for transport of cargo and/or passengers comprising one or more home stations and one or more aerial vehicles, preferably unmanned aerial vehicles (UAVs), for transporting the cargo and/or the passengers, the aerial vehicle comprising a cargo module, (preferably releasably attached to the aerial vehicle, more preferably the cargo module releasably comprised in a frame which is itself comprised in the aerial vehicle), adapted for holding the cargo and/or the passengers in one or more cargo compartments of the cargo module; the home station comprising an elevated docking station for docking one or more aerial vehicles, furthermore comprising a receiving station for receiving cargo and/or passengers which is separated from the docking station over a distance, and furthermore comprising a transport means connecting the docking station and the receiving station, whereby the docking station is adapted to physically establish a link with the aerial vehicle and stably secure said link, and whereby the docking station is preferably adapted to subsequently physically establish a link to the cargo module, whereby the receiving station comprises a receptacle for cargo and/or passengers and is adapted to withdraw at least part of the cargo and/or passengers from the cargo module into the receptacle when said cargo module is conveyed to the receiving station, and whereby the transport means is adapted for conveying at least the linked cargo module of a linked aerial vehicle between the docking station and the receiving station.

In a further aspect, the present invention provides a method for transporting cargo and/or passengers with an aerial vehicle, preferably an unmanned aerial vehicle (UAV), from and to a home station, the aerial vehicle comprising a cargo module, preferably releasably attached to the aerial vehicle, adapted for holding the cargo and/or the passengers in one or more cargo compartments of the cargo module; the home station comprising an elevated docking station for docking one or more aerial vehicles, furthermore comprising a receiving station for receiving cargo and/or passengers which is separated from the docking station over a distance; the method comprising the following steps:
  a. the aerial vehicle approaching the home station, preferably via an on-board navigation system;
  b. the aerial vehicle docking in the docking station, thereby:
    a. physically establishing a link with the aerial vehicle and stably securing said link; and
    b. subsequently physically establishing a link to the cargo module and/or to the linked aerial vehicle;
  c. conveying at least the linked cargo module of a linked aerial vehicle from the docking station to the receiving station;
  d. transferring the cargo and/or passengers respectively to the cargo module from the receiving station or from the cargo module to the receiving station; and
  e. conveying at least the linked cargo module of a linked aerial vehicle from the receiving station to the docking station.

A method according to an embodiment of the invention is particularly suitable for home delivery of packages, especially in heavily populated areas. The packages may vary and can range from medicines, food, electronics, newspaper or other written media, etc. . . . . .

DETAILED DESCRIPTION OF THE INVENTION

Figure 1A:
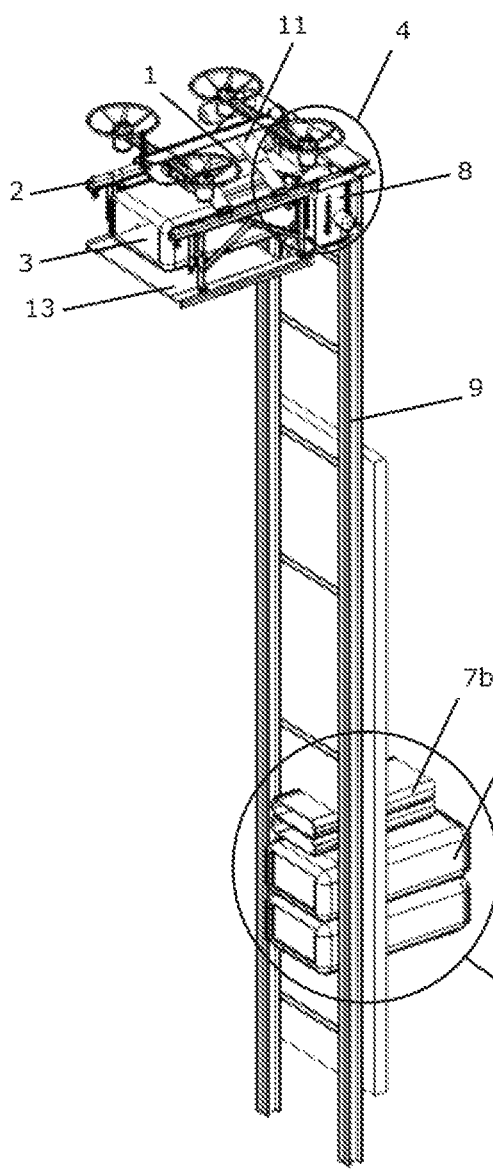
FIG. 1A-1B show an aerial vehicle docked onto a home station according to an embodiment of the invention.

The present invention concerns an improved system and method for cargo transport via (unmanned aerial) vehicles (preferably UAVs).

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Note that one or more the following definitions can apply partially or entirely to the terms used in the disclosed embodiments.

The term "aerial vehicle" refers to a vessel capable of airborne travel, preferably with increased maneuverability and accuracy. The aerial vehicle may be a drone which is piloted by an on-board pilot, but can also be remotely operated, and can be used for a range of transports, from goods, produce to passengers and/or animals.

The term "unmanned aerial vehicle" or "UAV" or "drone" is a particular version of the previously defined aerial vehicle, and refers to a vessel capable of airborne travel, and is specifically adapted for increased maneuverability (for instance for movements in populated areas) and accuracy. The vessels are preferably controlled by an automated system, although a pilot may also control them (or take over control from the automated system). It is of particular note that the vessels are capable of hovering at a location and capable of small movements, thereby allowing the vessels optimal movability and making them especially useful for purposes such as cargo delivery in populated areas (or areas with a lot of infrastructure, houses, etc.). Furthermore, it should be considered that, although the UAVs typically do not have an on-board pilot, they can however have passengers on board. In such a way, the UAV may function as a transport for people and/or animals.

Note that in what follows, the term "aerial vehicle" can in a particular embodiment of what is described, be understood as a UAV.

The term "home station" refers to the entire system for (U)AV cargo delivery, which comprises one or more docking stations for the aerial vehicles to 'land' and dock, and a separate receiving station (or several) to withdraw the cargo from the aerial vehicle, with a transport means connecting the two. Typically, the docking station will be located in an extended position with respect to an infrastructure, for instance outside of an apartment building on the roof or hanging from the outside walls at an elevated position, as this allows easy accessibility for the aerial vehicles. The receiving station will preferably be connected to (or even integrated in) a 'mailbox' system for consumers to then withdraw the cargo.

The term "docking station" refers to a station on which aerial vehicles may 'land' and dock. A docking station may therefore comprise one or more landing platforms, but could also simply comprise a clamping mechanism to grab and 'reel in' an aerial vehicle which has come into its proximity. Typically, a docking means will be integrated to stably secure the aerial vehicle once it is landed (and possibly perform other exchanges, for instance charging the aerial vehicle, or communicating with the aerial vehicle).

The term "receiving station" refers to a withdrawal (or loading) system that is adapted to withdraw (or load) cargo from (or in) the cargo module of the aerial vehicle. This may be in the form of robotized arms that can extract cargo, or could be in the form of the cargo module being tilted to allow the cargo to slide out, or even to withdraw compartments of the cargo module.

The term "receptacle" is meant to refer to a container in which cargo can be placed after withdrawal from the aerial vehicle, to provide the cargo to its proper recipient.

The term "transport means" refers to the system that connects the docking station and the receiving station, and specifically conveys the cargo module (and optionally frame and/or even aerial vehicle) between the two stations. Many possibilities exist in the embodiments thereof, for instance rails with a lift system, a chute, a slide, or even a conveyer belt, but is not limited to the above mentioned versions.

The term "movable linking means" or "cargo module linking means" are equivalent and refer to the apparatus that connects to (at least) the cargo module (optionally by connecting to the frame that holds it or even the aerial vehicle holding the frame holding the cargo module), and moving the cargo module between the docking station and the receiving station. This may simply be a motorized lift apparatus that travels over rails or cables, while maintaining a connection to the cargo module.

The term "aerial vehicle linking means" refers to an apparatus that connects to the aerial vehicle itself but not directly to the drone nor frame (if a frame is present). Note that this aerial vehicle linking means is separately movable from the cargo module linking means (but can of course move along with said cargo module linking means).

The term "frame" refers to a holding structure adapted to house the cargo module, and preferably protect this module from outside interference. The frame may be an actual closed container, but is preferably a framework which has the advantage of being light but resilient, and can easily be manipulated or secured, for instance via clamps. Note however that the concept of a "frame" is entirely optional, and that the cargo module may be directly attached to the aerial vehicle, or simply comprise a protective frame of its own. However, in some embodiments, it is preferable that a specifically adapted frame is provided to the aerial vehicle to form the link between aerial vehicle and container. In an especially preferred embodiment, the frame is a universal frame which can be (releasably) attached to any aerial vehicle or drone, and can in further embodiments be specifically adapted to hold particular types of cargo modules (typically one or more specific sizes). The advantages of such a universal frame speak for themselves, as each aerial vehicle could pick up any frame for transport, not necessarily its 'own' frame it may have released earlier but which is still being processed or used, and can simply depart with a fresh frame, potentially already preloaded with a filled cargo module.

The term "cargo module" refers to a container adapted for holding cargo and/or passengers. The cargo module may therefore be provided in many forms and dimensions (to hold different shapes, numbers and sizes of cargo and/or passengers).

The term "cargo" can be interpreted broadly as actually comprising both goods, materials, articles, merchandise, wares, baggage, but furthermore livestock as well as passengers. In particular cargo will be focused on goods, materials, articles, merchandise, wares, baggage however, especially when mentioned in combination with the term "passenger(s)".

The recitation of numerical ranges by endpoints includes all numbers and fractions subsumed within that range, as well as the recited endpoints.

In a first aspect, the invention pertains to a system for transport of cargo and/or passengers comprising one or more home stations and one or more aerial vehicles, preferably unmanned aerial vehicles (UAVs), for transporting the cargo and/or the passengers;

the aerial vehicle comprising a cargo module, preferably releasably attached to the aerial vehicle, adapted for holding the cargo and/or the passengers in one or more cargo compartments of the cargo module, the aerial vehicle comprising a frame for holding the cargo module, whereby the frame is releasably attached to the aerial vehicle;

the home station comprising a docking station for docking one or more aerial vehicles, furthermore comprising a receiving station for receiving cargo and/or passengers which is separated from the docking station over a distance, and furthermore comprising a transport means connecting the docking station and the receiving station, whereby the docking station is adapted to physically establish a link with the aerial vehicle and stably secure said link, whereby the docking station comprises a stationary aerial vehicle linking means for establishing the link with the aerial vehicle to the docking station, whereby said link is not with the cargo module, and whereby the docking station is adapted to physically establish a link to the cargo module of the linked aerial vehicle, whereby the docking station comprises a movable cargo module linking means for establishing the link with the frame to the docking station, said cargo module linking means being adapted for moving independently from the aerial vehicle linking means, and said movable cargo module linking means being adapted for detaching and attaching the frame from and to the aerial vehicle;

whereby the transport means is adapted for conveying the movable cargo module linking means and the linked frame and cargo module, detached from the linked aerial vehicle whereby said linked aerial vehicle is maintained stationary, between the docking station and the receiving station.

In a preferred embodiment, the transport means comprises one or more rails extending between the docking station and the receiving station, said rails being adapted for guiding at least the movable cargo module linking means between the docking station and the receiving station.

In an even further preferred embodiment, the movable cargo module linking means comprises a motor for conveying the cargo module linking means along the rails, preferably whereby said rails extend between the docking station and the receiving station along a substantially vertical axis.

In a preferred embodiment, the movable linking means comprises a drive system, preferably a motor-chain and/or motor belt, for conveying the movable linking means along the transport means.

In a preferred embodiment, the docking station comprises a landing platform for the aerial vehicle to land on, and whereby the stationary aerial vehicle linking means comprises one or more magnets for lining up the aerial vehicle with the docking station.

In a preferred embodiment, the cargo module comprises at least one, preferably at least two, compartment for holding cargo and/or passengers, which compartment can be, preferably slidably, removed from and inserted into the cargo module, and whereby the receiving station is adapted to remove and insert compartments from and in the cargo module, preferably whereby the receiving station is adapted to remove compartments from the cargo module at a first end of the cargo module and to insert compartments in the cargo module at a second end of the cargo module, opposite from the first end.

In a preferred embodiment, the docking station comprises a processor, whereby said processor comprises a wireless communication module, said wireless communication adapted to communicate with the aerial vehicle and to provide the aerial vehicle with instructions from the processor.

In a second aspect, the invention relates to a system for transport of cargo and/or passengers comprising one or more home stations and one or more aerial vehicles, preferably unmanned aerial vehicles (UAVs), for transporting the cargo and/or the passengers, the aerial vehicle comprising a cargo module, preferably releasably attached to the aerial vehicle, adapted for holding the cargo and/or the passengers in one or more cargo compartments of the cargo module;

the home station comprising a docking station for docking one or more aerial vehicles, furthermore comprising a receiving station for receiving cargo and/or passengers, which receiving station is separated from the docking station over a distance, and furthermore comprising a transport means connecting the docking station and the receiving station;

whereby the docking station is adapted to physically establish a link with the aerial vehicle and stably secure said link, and whereby the docking station is preferably adapted to subsequently physically establish a link to the cargo module of the linked aerial vehicle;

whereby the receiving station comprises a receptacle for cargo and/or passengers and is adapted to withdraw at least part of the cargo and/or the passengers from the cargo module into the receptacle when said cargo module is conveyed to the receiving station;

whereby the transport means is adapted for conveying at least the linked cargo module of a linked aerial vehicle between the docking station and the receiving station.

In a preferred embodiment, the docking station comprises a stationary aerial vehicle linking means for establishing the link with the aerial vehicle to the docking station, and the transport means comprising a movable linking means for establishing a link with the cargo module to the transport means, said movable linking means being adapted for detaching and attaching the cargo module to the aerial vehicle, and whereby the transport means is adapted for conveying the movable linking means and the detached cargo module between the docking station and the receiving station.

In an alternatively preferred embodiment, the aerial vehicle comprises a frame for holding the cargo module, whereby the frame is releasably attached to the aerial vehicle, whereby the docking station comprises a stationary aerial vehicle linking means for establishing the link with the aerial vehicle to the docking station, and said linking means further comprising a movable linking means for establishing a link with the frame to the transport means, said movable linking means being adapted for detaching and attaching the frame to the aerial vehicle, and whereby the transport means is adapted for conveying the movable linking means and the detached frame between the docking station and the receiving station.

In an alternatively preferred embodiment, the transport means comprises movable linking means, said movable linking means comprising an aerial vehicle linking means for establishing a link with the aerial vehicle to the transport means, and whereby the transport means is adapted for conveying the aerial vehicle linking means and the aerial vehicle with the cargo module between the docking station and the receiving station.

In a preferred embodiment for both first and second aspects, the receiving station comprises a bay for holding one or more mobile frames upon which mobile frames the cargo module, and optionally the frame holding the cargo module, can be attached. For more information on 'mobile frames', we refer to a later section in the description which goes into more details.

In a third aspect, the invention relates to a method for transporting cargo and/or passengers with an aerial vehicle, preferably an unmanned aerial vehicle (UAV), from and to a home station, the aerial vehicle comprising a cargo module, releasably attached to the aerial vehicle, adapted for holding the cargo and/or the passengers in one or more cargo compartments of the cargo module; the home station comprising a docking station for docking one or more aerial vehicles, furthermore comprising a receiving station for receiving cargo and/or passengers which is separated from the docking station over a distance; the method comprising the following steps:
  a. the aerial vehicle approaching the home station;
  b. the aerial vehicle docking in the docking station, thereby:
    I. physically establishing a link with the aerial vehicle and stably securing said link; and
    II. physically establishing a link to the cargo module of the linked aerial vehicle;
  c. detaching the cargo module from the aerial vehicle;
  d. conveying the linked cargo module of the linked aerial vehicle from the docking station to the receiving station;
  e. transferring the cargo and/or passengers respectively to the cargo module from the receiving station or from the cargo module to the receiving station;
  f. and optionally conveying the linked cargo module of the aerial vehicle from the receiving station to the docking station.

In a preferred embodiment, the home station comprises a stationary aerial vehicle linking means for establishing the physical link with the aerial vehicle to the docking station, and whereby the home station comprises a movable linking means for establishing a link to the cargo module, whereby the movable linking means is adapted for conveying the linked cargo module between the docking station and the receiving station.

In a further preferred embodiment, the method furthermore comprises the following step before the movable linking means conveys at least the linked cargo module of the linked aerial vehicle from the docking station to the receiving station:
  a. detaching the cargo module from the aerial vehicle;
and the method furthermore comprises the following step after the movable linking means conveys at least the linked cargo module of a linked aerial vehicle from the receiving station to the docking station:
  b. attaching the cargo module to the aerial vehicle.

In a preferred embodiment, the aerial vehicle comprises a frame, said frame being releasably attached to the aerial vehicle, and said frame being adapted for holding the cargo module, whereby the home station comprises a stationary aerial vehicle linking means for establishing the physical link with the aerial vehicle to the docking station, and whereby the home station comprises a movable linking means for establishing a link to the frame holding the cargo module, whereby the movable linking means is adapted for conveying the linked frame between the docking station and the receiving station.

In a further preferred embodiment, the method furthermore comprises the following step before the movable linking means conveys at least the linked frame holding the cargo module of the linked aerial vehicle from the docking station to the receiving station:
  a. detaching the frame holding the cargo module from the aerial vehicle;
and the method furthermore comprises the following step after the movable linking means conveys at least the linked cargo module of a linked aerial vehicle from the receiving station to the docking station:
  b. attaching the frame holding the cargo module to the aerial vehicle.

In a preferred embodiment, the home station comprises a movable linking means adapted to physically establish the link to the frame and adapted for conveying the frame from the docking station to the receiving station and back, and the home station comprising a stationary aerial vehicle linking means adapted to physically establish the link to the aerial vehicle, the method furthermore comprising the following step before the movable linking means conveys the frame holding the cargo module of the linked aerial vehicle from the docking station to the receiving station:
  a. detaching the frame from the aerial vehicle via the movable linking means;
the method further comprising the following step after the movable linking means conveys at least the linked frame holding the cargo module of the linked aerial vehicle from the receiving station to the docking station:
  b. attaching the frame holding the cargo module to the linked aerial vehicle via the movable linking means.

In a preferred embodiment, the docking station comprises a movable linking means adapted for establishing a physical link to the aerial vehicle comprising the cargo module, whereby the movable linking means is adapted for conveying the aerial vehicle and the cargo module thereof, between the docking station and the receiving station.

In a preferred embodiment, the aerial vehicle comprises a frame for holding the cargo module, whereby the cargo module linking means is adapted to establish a link to the frame holding the cargo module, whereby the step of detaching the cargo module from the aerial vehicle is effected by detaching the frame holding the cargo module from the aerial vehicle; the step of attaching the cargo module to the aerial vehicle is effected by attaching the frame holding the cargo module to the aerial vehicle; whereby the cargo module linking means conveys the frame holding the cargo module between the docking station and the receiving station.

In a preferred embodiment, the home station comprises one or more rails extending between the docking station and the receiving station along a substantially vertical axis, along which rails the movable linking means is conveyed between the docking station and the receiving station.

In a preferred embodiment, the home station comprises a cargo module linking means adapted to establish a link to the cargo module, the home station comprising one or more rails extending between the docking station and the receiving station, along said rails the cargo module linking means is conveyed between the docking station and the receiving station, and whereby the cargo module linking means comprises a motor for conveying the cargo module linking means along said rails, preferably whereby said rails extend between the docking station and the receiving station along a substantially vertical axis.

In a preferred embodiment, the method comprises further steps of:
a. providing one or more mobile frames to the receiving station, said mobile frame being capable of motorized transportation;
b. attaching the cargo module to said mobile frame, allowing for transportation of the cargo module via the mobile frame.

The embodiments of system and method in relation to mobile frames in the receiving station are to be considered in light of the growing desire to simplify and increase the comfort in human transit. The cargo module in this particular embodiment is specifically designed for passenger transit, and is similar to the passenger and driver space of a car for instance, while the mobile frame takes the role of a rolling chassis (complete with motor compartment and propulsions system) of a car or similar means of transport. In some embodiments, the cargo module may be adapted to allow a passenger to directly steer the mobile frame, and/or generally set a destination (which the mobile frame can then autonomously move towards). An example of such a mobile frame is the Pop.Up next concept of Audi, where passenger and/or cargo modules can be 'picked up' by an aerial vehicle or drone, and dropped on and coupled to a mobile chassis for further transport.

Note that in what follows, certain embodiments and examples are described which can also be applied to the above concepts and as such, form part of the invention thereof, for instance the methods and systems for communication between aerial vehicle and docking station/home station/receiving station, energy storage and supply for the aerial vehicle, unloading principles for the cargo module, and others.

In a further aspect, the invention relates to a system for transport of cargo and/or passengers comprising one or more home stations and one or more aerial vehicles, preferably unmanned aerial vehicles (UAVs), for transporting the cargo and/or the passengers, the aerial vehicle comprising a cargo module, adapted for holding the cargo and/or the passengers in one or more cargo compartments of the cargo module. The home station comprises a docking station for docking one or more aerial vehicles, and furthermore comprises a receiving station for receiving cargo and/or passengers which is separated from the docking station over a distance, and furthermore comprising a transport means connecting the docking station and the receiving station. The docking station is adapted to physically establish a link with the aerial vehicle and stably secure said link, whereby the docking station comprises an aerial vehicle linking means for, preferably subsequently, establishing the link with the aerial vehicle to the docking station, whereby said link is not with the cargo module, and whereby the docking station is adapted to physically establish a link to the cargo module of the linked aerial vehicle, whereby the docking station comprises a cargo module linking means for establishing the link with cargo module to the docking station, said cargo module linking means being adapted for moving independently from the aerial vehicle linking means, and said cargo module linking means being suitable for detaching and attaching the cargo module from and to the aerial vehicle. The is adapted to physically establish a link with the aerial vehicle and stably secure said link, whereby the docking station comprises an aerial vehicle linking means for establishing the link with the aerial vehicle to the docking station, whereby said link is not with the cargo module, and whereby the docking station is adapted to physically establish a link to the cargo module of the linked aerial vehicle, whereby the docking station comprises a cargo module linking means for establishing the link with cargo module to the docking station, said cargo module linking means being adapted for moving independently from the aerial vehicle linking means, and said cargo module linking means being suitable for detaching and attaching the cargo module from and to the aerial vehicle. The transport means is adapted for conveying the cargo module linking means and the linked cargo module, detached from the linked aerial vehicle whereby said linked aerial vehicle is maintained stationary, between the docking station and the receiving station if the cargo module is detachable from the aerial vehicle, and whereby the transport means is adapted for conveying both the cargo module linking means and the aerial vehicle linking means between the docking station and the receiving station if the cargo module is not detachable from the aerial vehicle.

In a preferred embodiment, the aerial vehicle comprises a frame for holding the cargo module, whereby the cargo module linking means is adapted for linking with said frame, whereby the cargo module linking means is adapted for detaching and attaching the frame holding the cargo module from and to the aerial vehicle.

It should furthermore be observed that the detachment, if possible, of the cargo module (with or without a frame) may be through a physical action (for instance, the cargo module linking means executing a predefined movement—tilting, rotation, translation, etc. or a combination of two or more) during or after linking to uncouple the cargo module from the aerial vehicle) or maybe via an automatic communication that is sent by the docking station to the aerial vehicle/cargo module when the cargo module linking means 'confirms' that it is linked to the cargo module, which causes the cargo module to be released. The second may be effected via a signal from the docking station to the aerial vehicle which causes the aerial vehicle to detach its cargo module, thus handing it over to the cargo module linking means.

In a further aspect, the invention relates to a method for transporting cargo and/or passengers with an aerial vehicle, preferably an unmanned aerial vehicle (UAV), from and to a home station, the aerial vehicle comprising a cargo module, preferably releasably attached to the aerial vehicle, adapted for holding the cargo and/or the passengers in one or more cargo compartments of the cargo module; the home station comprising a docking station for docking one or more aerial vehicles, furthermore comprising a receiving station for receiving cargo and/or passengers which is separated from the docking station over a distance; the method comprising the following steps:
- a. the aerial vehicle approaching the home station;
- b. the aerial vehicle docking in the docking station, thereby:
  - I. physically establishing a link with the aerial vehicle and stably securing said link; and
  - II. physically establishing a link to the cargo module of the linked aerial vehicle;

whereby the method comprises the step of:
- c. determining whether the cargo module is detachable from said linked aerial vehicle;

whereby in case the cargo module is detachable from the aerial vehicle, the method further comprises the following steps:
- d. detaching the cargo module from the aerial vehicle;
- e. conveying the linked cargo module of the linked aerial vehicle from the docking station to the receiving station;
- f. transferring the cargo and/or passengers respectively to the cargo module from the receiving station or from the cargo module to the receiving station;
- g. and optionally conveying the linked cargo module of the aerial vehicle from the receiving station to the docking station;

and whereby in case the cargo module is not detachable from the aerial vehicle, the method instead comprises the following steps:
- d. conveying the linked cargo module and the linked aerial vehicle from the docking station to the receiving station;
- e. transferring the cargo and/or passengers respectively to the cargo module from the receiving station or from the cargo module to the receiving station;
- f. and optionally conveying the linked cargo module and the linked aerial vehicle from the receiving station to the docking station.

In a preferred embodiment, the home station comprises a cargo module linking means adapted to establish a link to the cargo module, the method in case of the cargo module being detachable from the aerial vehicle furthermore comprising the following step:
- g. conveying the linked cargo module of the aerial vehicle from the receiving station to the docking station;
- h. and subsequently attaching the cargo module to the aerial vehicle;

whereby the cargo module linking means conveys the cargo module between the docking station and the receiving station.

Note that in a possible embodiment, step II. of physically establishing a link to the cargo module of the linked aerial vehicle is only performed when the cargo module is detachable. In this case, upon determination of the type of aerial vehicle (detachable cargo module or not), a link is established with the cargo module with the cargo module linking means, so the cargo module can be detached from the aerial vehicle and conveyed to the receiving station.

In a further preferred embodiment, the aerial vehicle comprises a frame for holding the cargo module, whereby the cargo module linking means is adapted to establish a link to the frame holding the cargo module, whereby the step of detaching the cargo module from the aerial vehicle is effected by detaching the frame holding the cargo module from the aerial vehicle, and the step of attaching the cargo module to the aerial vehicle is effected by attaching the frame holding the cargo module to the aerial vehicle, whereby the cargo module linking means conveys the frame holding the cargo module between the docking station and the receiving station.

The versatility of the concept above, with respect to other known systems, is that it allows aerial vehicles of all sorts to interact with the delivery system, so a far greater part of the drone population can deliver and pick up cargo (and/or passengers) from this delivery system. Most systems are adapted to a particular type of drone, which limits their 'audience'. A lot of systems are for instance adapted to receive the drone in its whole, and lower the entire drone to empty the cargo module. The system of the invention allows for drones with detachable cargo modules to remain at the docking station, while only the cargo module is removed and emptied/processed. This can allow the 'parked' drone to be provided with another cargo module that was ready (for instance, used previously, or simply in reserve), which speeds up the processing time as the drone no longer needs to wait for his own cargo module. Alternatively, it can even leave behind its cargo module entirely and simply take off to a next stop. In case the drone is of a different make and does not allow detachment of the cargo module, then the system is flexible enough to convey the drone in its entirety to the receptacle, where cargo is retrieved, and afterwards, the drone is conveyed upwards again where it can take off. None of the prior art systems allow this versatile processing of these two types of aerial vehicles. The advantage thus is that both types of aerial vehicles are accepted, but that the drones with a detachable cargo module can be processed quicker, by simply landing, dropping of its cargo module and taking a 'waiting' cargo module (or even take off without a new cargo module), without awaiting the return of its emptied cargo module, thus freeing up the docking station quicker, and becoming ready for use again quicker itself (thus also saving battery time). The invention in the most preferred embodiment thus situates itself in an aspect in that two separate links are (or can be) formed between the aerial vehicle and cargo module to the home station.

In a possible embodiment, the aerial vehicle is provided with a specific frame adapted for holding the cargo module and furthermore adapted for linking with the cargo module linking means. The frame is specifically adapted to detachable couple with the aerial vehicle, for instance via one or more clamps, or other attachment means. Preferably, said clamps or attachment means can be controlled upon linking with the cargo module linking means (either wiredly or wirelessly), in order to attach to or detach from the aerial vehicle. An advantage of such a specifically adapted frame is that it compatible with all types of drones, by choosing the coupling means to be flexible (movable clamping system or other means). A further advantage is that the interchangeable frames allow the cargo modules to be swapped between separate aerial vehicles, thereby not forcing them to await their own frame and cargo module (as mentioned before).

In a further aspect, the invention relates to a system for transport of cargo and/or passengers comprising one or more home stations and one or more aerial vehicles, preferably unmanned aerial vehicles (UAVs), for transporting the cargo and/or the passengers, the aerial vehicle comprising a cargo module, preferably releasably attached to the aerial vehicle, adapted for holding the cargo and/or the passengers in one or more cargo compartments of the cargo module. The home station comprising a docking station for docking one or more aerial vehicles, furthermore comprising a receiving station for receiving cargo and/or passengers which is separated from the docking station over a distance, and furthermore comprising a transport means connecting the docking station and the receiving station, whereby the docking station is adapted to physically establish a link with the aerial vehicle and stably secure said link, and whereby the docking station is preferably adapted to subsequently physically establish a link to the cargo module of the linked aerial vehicle, whereby the receiving station comprises a receptacle for cargo and/or passengers and is adapted to withdraw at least part of the cargo and/or the passengers from the cargo module into the receptacle when said cargo module is conveyed to the receiving station, whereby the transport means is adapted for conveying at least the linked cargo module of a linked aerial vehicle between the docking station and the receiving station, whereby the cargo module comprises at least one compartment for holding least part of the cargo and/or passengers, whereby said compartment comprises no bottom wall, said compartment further comprising a handle, and whereby said compartment is slidably retractable from the cargo module, and whereby the receptacle comprises a hook mechanism for linking with the compartment via the handle, and adapted for moving the linked compartment between the cargo module and the receptacle via an opening in said receptacle, and whereby the receptacle comprises an open lower section which is positioned at a lower level than the opening of the receptacle.

The fourth further relates to a method for transporting cargo and/or passengers with an aerial vehicle, preferably an unmanned aerial vehicle (UAV), from and to a home station, the aerial vehicle comprising a cargo module, preferably releasably attached to the aerial vehicle, adapted for holding the cargo and/or the passengers in one or more cargo compartments of the cargo module; the home station comprising a docking station for docking one or more aerial vehicles, furthermore comprising a receiving station for receiving cargo and/or passengers which is separated from the docking station over a distance; the method comprising the following steps:

a. the aerial vehicle approaching the home station;
b. the aerial vehicle docking in the docking station, thereby linking to the cargo module;
c. conveying said cargo module from the docking station to the receiving station, whereby said cargo module is either detached from the aerial vehicle and is conveyed to the receiving station separately, or whereby said cargo module remains fixed to the aerial vehicle and is conveyed to the receiving station with the aerial vehicle;
d. transferring the cargo and/or passengers respectively to the cargo module from the receiving station or from the cargo module to the receiving station;

whereby the cargo module comprises at least one compartment for holding least part of the cargo and/or passengers, whereby said compartment comprises no bottom wall, said compartment further comprising a handle, and whereby said compartment is slidably retractable from the cargo module, whereby the receiving station comprises a receptacle for receiving the cargo, which receptacle comprises a hook mechanism for linking with the compartment via the handle, and adapted for moving the linked compartment between the cargo module and the receptacle via an opening in said receptacle, and whereby the receptacle comprises an open lower section which is positioned at a lower level than the opening of the receptacle, the method further comprising a step of:

e. the hook mechanism of the receptacle linking with the handle of the compartment;
f. moving the linked compartment between the cargo module and the receptacle, whereby the cargo module is moved to a position at least partially inside of the receptacle, whereby the portion of the cargo module inside of the receptacle is positioned above the open lower section of the receptacle;
g. optionally returning the linked compartment from the receptacle to the cargo module and decoupling the hook mechanism from the handle.

It is clear that the specific build-up of the receiving station, and specifically of the receptacle thereof, allows an extremely efficient withdrawal of cargo from the cargo module. The lower section of the receptacle is open towards the top, so the cargo in the overhanging compartment of the cargo module, which is open towards the bottom, will drop down into the receptacle. Given that the depth of this 'fall' is negligible, there is no danger of damage to the cargo. Furthermore, the receptacle may be provide with a shock-absorbing inside, for instance a cushion, to break the fall further.

The further aspects may be advantageously combined with other aspects above, and/or with any of the further aspects, and/or with any or all of the embodiments further discussed in this document.

Note that the following preferred embodiments are also applicable to the above aspects, whereby, as mentioned, the term "movable linking means" can be read to refer to the "cargo module linking means" of above.

In a further aspect, the invention provides a system for transport of cargo and/or passengers comprising one or more home stations and one or more (unmanned) aerial vehicles (preferably UAVs) for transporting the cargo and/or passengers, the aerial vehicle comprising a cargo module, preferably releasably attached to the aerial vehicle (optionally via a frame comprised in the aerial vehicle), adapted for holding the cargo and/or the passengers in one or more cargo compartments of the cargo module; the home station comprising a docking station for docking one or more aerial vehicle, furthermore comprising a receiving station for receiving cargo and/or passengers which is separated from the docking station over a distance, and furthermore comprising a transport means connecting the docking station and the receiving station, whereby the docking station is adapted to physically establish a link with the aerial vehicle and stably secure said link, and whereby the docking station is preferably adapted to subsequently physically establish a link to the cargo module (and/or optionally to the frame of the linked aerial vehicle). The receiving station comprises a receptacle for cargo and/or passengers and is adapted to withdraw at least part of the cargo and/or passengers from the cargo module into the receptacle when said cargo module is conveyed to the receiving station. The transport means is adapted for conveying at least the linked cargo module of a linked aerial vehicle between the docking station and the receiving station.

As mentioned before, the docking station, where the aerial vehicle will land and depart, is typically in an elevated position (although outlying positions are also possible, where the docking station is mounted on a wall). This docking station is adapted to allow aerial vehicles to land and to thereby physically establish a link to hold it at the docking station, although additional links are preferably also made to keep the aerial vehicle in a desired position (for instance for charging). Note that the docking station in this sense can comprise a landing platform of some sort. Furthermore, it is to be noted that the docking station preferably comprises short-range communication devices in order to communicate with the aerial vehicle. This enables the docking station to very accurately guide the aerial vehicle in the last part of its Itinerary to dock correctly (position as well as orientation), as this often requires a substantial amount of precision. The additional link to the cargo module (and/or the frame) allows a better (more secure) connection, but furthermore in certain embodiments enables the system to separately convey the cargo module (with or without the frame which holds the cargo module) between the docking station and the receiving station. The system in itself is therefore characterized by the feature of a transport means that conveys at least the cargo module between the docking station and the receiving station, whereas prior art systems only move the cargo and/or passengers.

Most prior art systems (such as the ones cited) which employ a system for cargo delivery with aerial vehicles and home stations, follow a similar tactic, namely the aerial vehicle landing on the home station, at which point the cargo is extracted from the aerial vehicle and then delivered to the appropriate end destination (for example a particular mailbox). The docking station is usually located on rooftops, or even on top of poles or towers, and is generally in an elevated position. It is the intention of the applicant to provide a system in which the cargo is not extracted at the 'landing site', but that it is conveyed from the landing site or docking station to the receiving station in the cargo module. This has, amongst others, the advantage that the cargo is additionally protected by the cargo module during transport against damage or other environmental factors (heat, moisture, wind, . . . ), but primarily that the cargo module is a known quantity, and receiving stations can be easily adapted to function well with said cargo module. This can range from enhanced docking of the cargo module to the receiving station, an automated retrieval system to transfer the cargo to the receiving station (and specifically to a correct receptacle such as a mailbox), to a system which allows the aerial vehicle to be supplied with new batteries at the receiving station (or at the docking station). Furthermore, by conveying the cargo module to the receiving station in its entirety, this would also make it more efficient to place new cargo in the cargo module to be sent with the aerial vehicle, since this can all be done in a single operation, instead of separate actions. By performing the more intricate actions at the receiving station (extracting cargo, placing new cargo . . . ), the hardware to enact this is also mainly present at the receiving station. Given the vulnerability of hardware, it is advantageous to have it closer to the receiving station which will typically be in a more secure location (protected from damage or other effects of its environment), and will therefore also be easier to repair should problems occur. This as opposed to old systems in which a technician will have to mount the home station to a typically high-placed docking station, which makes repairs or maintenance more difficult and less safe. In this aspect, it is preferable that as much hardware as possible is placed at an easily reachable position. Furthermore, in some embodiments, the cargo module (with or without the frame) is detached from the aerial vehicle. This allows the home station to attach a new cargo module (and possibly frame) to the aerial vehicle adapted for new cargo that is to be sent from said home station with the aerial vehicle to a further recipient. Since in some cases cargo may have variable volume or form, sometimes a need is present for specific cargo modules to hold the cargo. This can be then easily solved by simply swapping out the cargo module (and possibly frame).

In an additional aspect, the receiving station is preferably furthermore adapted to transfer new cargo into the cargo module. By doing so, the home station is no longer required to transfer the new cargo to the docking station where the aerial vehicle is, but straight into the cargo module, with the abovementioned advantages.

In a first preferred embodiment of the invention, the cargo module is releasably attached to the aerial vehicle, and the docking station comprises a stationary aerial vehicle linking means for establishing the link with the aerial vehicle to the docking station. The transport means comprises a movable linking means for establishing a link with the cargo module to the transport means, said movable linking means being adapted for detaching and attaching the cargo module to the aerial vehicle. Furthermore, the transport means is adapted for conveying the movable linking means and the detached cargo module between the docking station and the receiving station.

In this particular embodiment, the cargo module can be detached from the aerial vehicle, and is then conveyed from the docking station to the receiving station by the transport means, through a link established between the cargo module and the transport means, specifically by the movable linking means of the transport means. Note that said link (movable) is preferably established after the establishment of the link of the aerial vehicle to the docking station. This enables the aerial vehicle to be brought into a correct position so the movable linking means can correctly link to the cargo module and detach said cargo module. Once the cargo module is secured by the movable linking means, and thus by the transport means, it is conveyed along the path between the docking station and the receiving station via the transport means. Note that the transport means can comprise a physical pathway (for instance rails or the likes of this) as well as one or more movable units which can be conveyed along the pathway. The cargo module is attached to one of the movable units and thus is conveyed in accordance with the movable unit. As mentioned before, this transports the cargo safely to (and from) the receiving station where it can be withdrawn easier. Additionally, by detaching the cargo module, only a small part of the aerial vehicle needs to be actually moved for this, so the energy demands are minimized, while there is little to no danger to damage the aerial vehicle itself (which tends to be fragile).

In a second preferred embodiment of the invention, the aerial vehicle comprises a frame for holding the cargo module, whereby the frame is releasably attached to the aerial vehicle, and the docking station comprises a stationary aerial vehicle linking means for establishing the link with the aerial vehicle to the docking station. Said linking means further comprises a movable linking means for establishing a link with the frame to the transport means, with said movable linking means being adapted for detaching and attaching the frame to the aerial vehicle. Furthermore, the transport means is adapted for conveying the movable linking means and the detached frame between the docking station and the receiving station.

In this alternative embodiment, the frame can be detached from the aerial vehicle in its entirety. Note however that the cargo module is still held in (or by) the frame. The applicant has noticed that in certain situations, it may be preferable that the frame can be detached from the aerial vehicle and conveyed from the docking station to the receiving station in its entirety, while holding the cargo module. Again, the added advantage is that the frame is a known quantity and thus the receiving station can easily and automatically withdraw cargo from the cargo module (or place new cargo therein), as it knows the exact position of the cargo module via the frame. Furthermore, by conveying the entire frame, more security is provided to the conveyed cargo, while still keeping the weight of what is conveyed via the transport means (and the movable linking means specifically) as low as possible (the frame will typically not weigh much more than the cargo module). As before, first the aerial vehicle will dock and be secured (by a first linking means, preferably stationary, such as one or more clamps, magnets, or similar systems), afterwards the frame will be physically linked by the movable linking means. This can as well be executed via a clamping mechanism or a magnetic system, but generally can be performed by any connector mechanism which is adapted specifically for the frames (which would preferably have a matching mechanism or means that couples to the connector mechanism of the linking means.

In an third preferred embodiment of the invention, the transport means comprises movable linking means, said movable linking means comprising an aerial vehicle linking means for establishing a link with the aerial vehicle to the transport means. Furthermore, whereby the transport means is adapted for conveying the aerial vehicle linking means and the aerial vehicle with the cargo module between the docking station and the receiving station.

In this embodiment, the entire aerial vehicle (with an optional frame and cargo module) are conveyed to the receiving station after docking. Note that in theory, the docking station can be movable, and takes the docked aerial vehicle along to the receiving station. However, it may also be the case that only part of the docking station is conveyed or moved, or that the docking station remains stationary and that the transport means is wholly separate therefrom. The advantage that the cargo is only transferred from the cargo module at the receiving station, is maintained. In addition, by conveying the entire aerial vehicle to the receiving station, it is now possible to exchange batteries of the aerial vehicle (since docking and delivering/receiving the cargo typically takes too short to charge batteries sufficiently without advanced hardware, swapping batteries is preferred, since these can be charged for the next aerial vehicle at their leisure once in the receiving station) in a more controlled environment (instead of at the docking station which is generally hard to reach). In this embodiment, the aerial vehicle is provided with one or more exchangeable batteries which can be recharged.

In a preferred embodiment of (at least) the three preceding alternative embodiments, the transport means comprises one or more rails extending between the docking station and the receiving station, said rails being adapted for guiding at least the movable linking means between the docking station and the receiving station. The movable linking means comprises a motor for conveying the movable linking means along the rails, preferably whereby said rails extend between the docking station and the receiving station along a substantially vertical axis. Alternatively, the rails extend along a substantially horizontal axis.

Rails present as a simple but efficient system via which the transport means can convey the cargo module (with or without frame/aerial vehicle) between the docking station and the receiving station. The movable linking means can comprise a motor which is adapted to allow movement of the movable linking means along the rails.

As mentioned earlier, since the docking station is often in an elevated or otherwise outlying position (hanging from a wall at a height), the rails will typically be straight along one axis, most often a vertical axis, although a horizontal axis may be the case (for example when the docking station is hanging from a wall over a distance). It is possible that the rails have a curvature should the situation demand it, or even have turns. This is especially the case when dealing with very large structures with a centralized delivery station (receiving station), but also in smaller structures where the receiving station is actually a plurality of receiving stations (for instance mailboxes of different occupants in an apartment building or offices)

In a preferred embodiment, the transport means comprises one or more rails extending between the docking station and the receiving station along a substantially vertical axis, whereby the rails are adapted to extend or retract to convey the aerial vehicle to and from the receiving station.

The rails can be telescopic and slide in and out (or alongside) of each other, but are however directed by a motor which is preferably operated based on signals of the docking station. For instance, on the approach of an aerial vehicle, the docking station will receive signals thereof and in turn communicate to the motor to extend the rails, and thus present the docking station so the aerial vehicle may dock. Once the aerial vehicle is securely attached, the docking station may signal the motor to retract the rails, thus bringing the docking stations (and the aerial vehicle which is docked thereon) back towards the receiving station where cargo may be retrieved from or placed into the cargo module of the aerial vehicle).

An advantage of the feature of extendable/retractable rails is that the docking station can be retracted in its entirety from its elevated or otherwise extended position. This does not only make collecting cargo from the aerial vehicle easier (or placing new cargo therein), but it also allows the docking station to be brought into a safe position when not active, when no deliveries are scheduled, or in case of bad weather, etc.

In a further preferred embodiment, the docking station is adapted to receive power via the one or more rails for charging one or more batteries of the aerial vehicle. Note that it remains an option to charge the battery or batteries of the aerial vehicle directly while still in the aerial vehicle, or to swap batteries with the aerial vehicle and charge the swapped battery that remains at the docking station with the power received via the rails, or even both. By using the rails to provide power, extra wiring is avoided. The power can be provided via internal wiring in the rails to avoid accidental exposure and prevent damage, or can be provided via external power lines along the rails. Note that the docking station may be provided with power from other (net) sources as well, and that this not necessarily need to originate from the receiving station and/or run via the rails. Furthermore, the battery or batteries remaining at the docking station can be charged via a solar panel or the likes on the docking station, in addition or in replacement of charging via a wired connection to the electricity net. The advantages are clear of such a setup, where one or more batteries are present at the docking station at all times for charging, and can then be swapped with batteries of linked aerial vehicles.

In a preferred embodiment, the docking station is adapted to replace one or more batteries of the aerial vehicle with a charged battery and/or whereby the docking station is adapted to charge one or more batteries of the aerial vehicle via the link and/or via wireless charging. Note that this embodiment can be present in addition to or instead of the features of the preceding embodiment.

In a preferred embodiment, the docking station is adapted to hold one or more batteries, and for charging said batteries, via power of the electricity grid and/or via other power sources, such as one or more photovoltaic cells or solar panels, wind turbines, etc., provided on and/or close to the docking station, of which the power can be used to power the docking station and/or charge the batteries held by the docking station. These batteries held by the docking station can serve in one or more fashions furthermore. These can be used to power the docking station at all times to keep it operational without need for external power support (electric grid), but can also be used as battery swaps for aerial vehicles that have landed. Preferably, the docking station can assess the state of charge of the battery/batteries of the aerial vehicle, and based on this, can decide whether to swap batteries. The aerial vehicle may also be able to override the decision of the docking station. Lastly, the batteries may of course serve both functions, both as swap batteries and as battery pack for the docking station itself.

The swapped batteries of the linked aerial vehicle can in turn be charged by the docking station afterwards via one or more of the aforementioned charging methods. The charging contact is preferably established via magnets.

In a variation, the battery/batteries of the aerial vehicle may be comprised in the cargo module in the future. This could allow the system to replace the entire cargo module upon receipt, whereby the new cargo module will hold charged batteries. The batteries of the swapped cargo module can then be charged for future exchanges. Alternatively, the batteries in the cargo module may simply be swapped at the receiving station or at the docking station without replacement of the entire cargo module.

As noted before, it is impractical to have to recharge aerial vehicles while they are docked, as, even with newer and more advanced models, battery life for aerial vehicles is relatively short, and charging would take an exorbitant amount of time. Therefore, it is preferred that the home station comprises one or more surplus batteries for aerial vehicles and a means to charge the batteries. This way, the batteries of an aerial vehicle that docks in the home station can be swapped out and replaced by a (more) charged one, while the empty or emptier batteries that were taken out of the aerial vehicle can be charged at their leisure. Preferably, the aerial vehicle comprises a shape of form allowing easy replacement of battery or batteries when docked.

In a preferred embodiment, the docking station comprises a landing platform for the aerial vehicle to land on, and the docking station further comprises a docking means for correctly lining up the aerial vehicle with the docking station to physically establish the link of the aerial vehicle to the docking station. Said docking means comprises one or more magnets for lining up the aerial vehicle with the docking station comprising a processor, whereby said processor comprises a wireless communication module, said wireless communication adapted to communicate with the aerial vehicle and to provide the aerial vehicle with instructions from the processor. Alternatively (or additionally) the docking means can comprise clamping mechanisms to clamp parts of the aerial vehicle (be it the aerial vehicle itself, the frame or the cargo module).

The landing platform may be designed to present as a flat surface, or may simply provide supports on both lateral sides of the landing aerial vehicle. This would for instance easily allow the detachment of the cargo module (and possibly the frame) from the aerial vehicle and the lowering thereof to the receiving station (and ascent from the receiving station back to the aerial vehicle).

The docking station (docking means) can correct possible aberrations from the desired position of the aerial vehicle to enable correct docking. As mentioned before, in order for the transport means to be able to correctly link up the cargo module for transport between the docking station and the receiving station, the aerial vehicle needs to be very delicately positioned, not only in terms of distance to the docking station, but also in terms of rotational orientation, so the transport means can link to and convey the cargo module (between docking station and receiving station), and/or so the receiving station may withdraw (or place) cargo from (or into) the cargo module. Although the aerial vehicle can land relatively accurately on a landing platform when the docking station provides the instructions, there will almost always be some variation (wind, distortion on signal, time lag in signal . . . ) which is preferably corrected. Thus, the applicant has provided a docking means to achieve this goal. In a first version, this can be a system of magnets which, once the aerial vehicle is in its approximate position (not necessarily after landing) brings the aerial vehicle in the exact desired position by acting on a magnetizable section of the aerial vehicle (for instance part of the frame should this be comprised in the aerial vehicle). Since the general positioning of the aerial vehicle can be very accurate on its own, the magnets will not necessarily need to be strong to correct aberrations, so the magnetic field will not disturb other systems. In an alternative version, clamping mechanisms may be present designed to grab the aerial vehicle (again for instance by the frame) once it is in range, and then bringing the aerial vehicle into the desired position. Note that a combination may be used as well, using magnets to bring the aerial vehicle into the clamping mechanisms range, after which the clamps can move the aerial vehicle into position.

In a preferred embodiment, the docking station may comprise one or more solar panels. As the docking station is most often found in a high position distanced from buildings to allow easy landing and take-off of the aerial vehicles, solar panels on the docking station will generally be in an excellent position to generate energy from the sunlight. The solar panels may for instance be built into a landing platform on which the aerial vehicle can land. This energy can be used to do any one or more of the following: power the docking station, charge batteries, power the transport means, etc.

In a preferred embodiment, the receiving station may comprise one or more cooled receptacles, for instance for delivery of food, medicine, or other cargo that needs cold storage. The home station may be so adapted that the aerial vehicle (or a central control system) alerts the home station that a cargo is brought which is to be kept in cold storage, so the receiving station may store the cargo in the appropriate receptacle. A similar improvement may be present for ready-made food deliveries, which cargo can then be kept in an insulated storage receptacle to preserve the heat.

It is to be understood that in both cases, the cargo module can be specifically adapted to serve the specific purposes as well.

In a preferred embodiment, the docking station comprises a landing platform or landing box for the aerial vehicle, which platform or box can be closed. This is especially useful in case of bad weather, to protect the aerial vehicle. Alternatively or additionally, an overhanging structure or awning (preferably rigid) may be provided to protect the landing platform or box, which overhanging structure in turn may be retractable, collapsible, or otherwise removable.

In a preferred embodiment, the docking station comprises a landing platform for the aerial vehicle which can be folded in (as seen in the Figures).

In a preferred embodiment, the cargo module (and most likely the frame and aerial vehicle as well) is adapted to allow the receiving station to manipulate the cargo both from the front and from the rear side of the cargo module. This could mean that the aerial vehicle is as well adapted to dock both with the front and the rear side to the docking station. The cargo module in this embodiment may have at least two doors or openings through which cargo may be withdrawn or loaded. Note that such a two-sided approach means that cargo may be loaded into the cargo module from one side, and withdrawn from the other for instance.

In a preferred embodiment, the docking station and the aerial vehicle are provided with communication systems adapted to communicate with each other, at least over short range. This can be advantageous in docking the aerial vehicle, as the docking station can correct for deviations of the desired landing/docking position of the aerial vehicle. This can for instance be achieved via sensors which can detect the aerial vehicle's position and determine whether it is correctly aligned with the docking station. Additionally, the communication can be used to direct other actions, such as delivery confirmation, transmitting cargo information, or controlling battery swap (checking power level of battery/batteries to be replaced and replacement battery/batteries, etc.).

In a preferred embodiment, the transport means comprises wheels adapted to allow movement of (at least) the cargo module over the transport means' pathway.

The cargo module preferably comprises a number of compartments which allows the aerial vehicle to deliver a plurality of separate 'packages' (and/or to pick up separate packages). Note that this can be performed by providing a number of 'drawers' (or similar systems) which can be manipulated at the receiving station to withdraw and/or to load cargo. For instance, the cargo module may be accessible from both the front and the rear, which could allow parallel delivery of one or more cargo packages and/or retrieval of one or more cargo packages, e.g. withdrawal of cargo to be delivered at the front side, new cargo provided to the cargo module via the rear side.

Preferably, the aerial vehicle comprises a communication system that allows communication between the aerial vehicle and the cargo module and/or frame to direct detachment of the frame or cargo module from the aerial vehicle.

In a preferred embodiment, the cargo module may be adapted to hold humans (and/or animals) for transport.

In a preferred embodiment, the cargo module comprises at least two compartments for holding cargo, which compartments can be, preferably slidably, removed from and inserted into the cargo module, and whereby the receiving station is adapted to remove and insert compartments from and in the cargo module, preferably whereby the receiving station is adapted to remove compartments from the cargo module at a first end of the cargo module and to insert compartments in the cargo module at a second end of the cargo module, opposite from the first end. Note that the compartments may be in the form of trays, and that the cargo module may be adapted to house any number of them in varying sizes (for instance at a first end 1 large tray, on the opposite end 3 smaller trays). This embodiment gives the added advantage that a first end may be used to withdraw compartments from the cargo module, which compartments can then be emptied by the receiving station? The second end may then be used to receive cargo (in compartments).

By accessing and using both ends of the cargo module, loading and unloading times can be halved. Details on this aspect will be given in the examples, although it is to be considered that the essence of this aspect transcends the requirements of the invention and could easily be implemented in other, similar systems to optimize delivery and loading.

In this light, the applicant further submits the following aspect of this invention, that of a system for transport of cargo and/or passengers comprising one or more home stations and one or more aerial vehicles, preferably unmanned aerial vehicles (UAVs), for transporting the cargo (in a cargo module on the aerial vehicle). The home station comprises a docking station (where aerial vehicle can land and dock) and a receiving station (where cargo can be withdrawn and/or uploaded to a cargo module of the aerial vehicle, and a means to transport aerial vehicles docked at the home station, between the docking station and the receiving station. The cargo module of the aerial vehicle is specifically adapted to be able to receive and hold any number (1, 2, 3, 4, 5, 6, 7, 8, 9, 10, 15, 20 etc.) of (slidably) removable compartments at both a front and a rear end. The receiving station is adapted to remove (or partially retract) specific compartments from the cargo module (for instance through recognition via an identifier such as a QR-code) in order to receive the cargo from said compartment. This allows the aerial vehicle to act as a delivery system for a number of users, ensuring the right cargo arrives at the right user. Furthermore, the receiving station may be adapted to remove or partially retract compartments from the cargo module to load new cargo into said compartments, which can then be reinserted into the cargo module for future delivery. Alternatively, new compartments may be simply loaded into the cargo module where a compartment was removed earlier.

It is to be considered that most, if not all, of the improvements discussed in this document are applicable to this aspect of the invention as well.

In a further aspect, the invention relates to a method for transporting cargo and/or passengers with an aerial vehicle, preferably an unmanned aerial vehicle (UAV), from and to a home station, the aerial vehicle comprising a cargo module, preferably releasably attached to the aerial vehicle, adapted for holding the cargo and/or the passengers in one or more cargo compartments of the cargo module; the home station comprising a docking station for docking one or more aerial vehicles, furthermore comprising a receiving station for receiving cargo and/or passengers which is separated from the docking station over a distance; the method comprising the following steps:

a. the aerial vehicle approaching the home station, preferably via an on-board navigation system;
 b. the aerial vehicle docking in the docking station, thereby:
   a. physically establishing a link with the aerial vehicle and stably securing said link; and
   b. subsequently physically establishing a link to the cargo module of the linked aerial vehicle;
 c. conveying at least the linked cargo module of a linked aerial vehicle from the docking station to the receiving station;
 d. transferring the cargo and/or passengers respectively to the cargo module from the receiving station or from the cargo module to the receiving station; and
 e. conveying at least the linked cargo module of a linked aerial vehicle from the receiving station to the docking station.

It is to be noted that the steps of conveying the cargo module will typically be executed by a movable linking means comprised in the home station. The movable linking means can be part of a transport means, which transport means connects the docking station and the receiving station (for example via rails over which the movable linking means moves). The methods builds further on what is discussed for the system, namely that the cargo module is conveyed between docking station and receiving station, and that the cargo is withdrawn from or emplaced in the cargo module at the receiving station, instead of the cargo being withdrawn or emplaced at the docking station as is the case in the prior art systems, where the cargo is then moved between the docking station and the receiving station while the aerial vehicle and cargo hold remain stationary at the docking station. The advantages have been discussed amply in the preceding text and apply to the method above as well.

In a preferred embodiment, the home station comprises a movable linking means adapted to establish a link to the cargo module, the method furthermore comprising the following step before the movable linking means conveys at least the linked cargo module of a linked aerial vehicle from the docking station to the receiving station:

a. detaching the cargo module from the aerial vehicle;

and the following step after the movable linking means conveys at least the linked cargo module of a linked aerial vehicle from the receiving station to the docking station:

b. attaching the cargo module to the aerial vehicle.

whereby the movable linking means conveys the cargo module between the docking station and the receiving station.

In an alternative embodiment, the aerial vehicle comprises a frame for holding the cargo module, whereby the home station comprises a movable linking means adapted to establish a link to the frame holding the cargo module, the method furthermore comprising the following step before the movable linking means conveys at least the linked cargo module of a linked aerial vehicle from the docking station to the receiving station:

a. detaching the frame holding the cargo module from the aerial vehicle;

and the following step after the movable linking means conveys at least the linked cargo module of a linked aerial vehicle from the receiving station to the docking station:

b. attaching the frame holding the cargo module to the aerial vehicle;

whereby the movable linking means conveys the frame holding the cargo module between the docking station and the receiving station.

These embodiments specifically make it clear that the cargo module or frame and cargo module are detached from the aerial vehicle, and then conveyed with the movable linking means between the docking station and the receiving station. The advantages of these are as mentioned the improved accessibility of the retrieval and/or loading system with which cargo is withdrawn from or loaded into the cargo module. Prior art systems perform this action at the docking stations, which are located at inconvenient and often unreachable positions (suspended from walls, rooftops, towers . . . ). This greatly inconveniences maintenance, repair or installation operations, which results in an increased cost, danger and difficulty. Additionally, the hardware to perform the retrieval/loading will be located at these hard-to-reach positions which are often subject to harsh environmental conditions and can be damaged far more easily. Note that this also makes the docking station more compact, which is desirable for many of the aforementioned reasons, as well as the reduced volume and surface reducing damage from environmental conditions (note that this also includes wildlife such as birds, etc.).

In an alternatively preferred embodiment, the home station comprises a movable linking means which is adapted to establish a link to the aerial vehicle comprising the cargo module, whereby the movable linking means conveys the aerial vehicle and the cargo module (and optionally a frame holding said cargo module and itself comprised in the aerial vehicle) from the docking station to the receiving station.

In a further preferred embodiment, the home station comprises one or more rails extending between the docking station and the receiving station along a substantially vertical axis, and whereby the movable linking means is conveyed between the docking station and the receiving station by extending or retracting the rails. Alternatively, the rails extend along a substantially horizontal axis.

Retracting and extending the rails to convey the movable linking means (and thus the cargo module) to and from the receiving station allows an easy collection of the cargo module, under limited energy expense. Additionally, in case the entire docking station is retracted and extended by the telescoping rails, this allows the docking station to be brought in a secure position (less subject to environmental conditions and damage) when not operational (when no delivery is scheduled within a certain amount of time, during adverse atmospheric conditions, etc.).

In a preferred embodiment, the method comprises a step of assessing the state of charge of the battery/batteries of the aerial vehicle (as it necessarily has a power source) by the docking station. If the state of charge falls below a certain threshold level, and the battery/batteries correspond to a (more) charged battery that the docking station is holding, the docking station may initiate a swap of said battery/batteries between the aerial vehicle and itself. Afterwards, the received battery/batteries from the aerial vehicles are preferably charged by the docking station (to be ready for a future exchange). The charging of batteries held by the docking station may be continuous (via a power grid connection), and/or can stem from a renewable energy source on the docking station, such as solar panels, wind turbines or the likes (or can originate from a battery fixed on the docking station, that is charged via one or more of the above methods). In preferred embodiments, the docking station is equipped with one or more (two, three, four or more) batteries, in some embodiments even one or more batteries of different types depending on the prevalence of the different types of aerial vehicles and their batteries in certain areas.

In a preferred embodiment, whereby the home station comprises a cargo module linking means adapted to establish a link to the cargo module, the home station comprises one or more rails extending between the docking station and the receiving station, along said rails the movable linking means is conveyed between the docking station and the receiving station, and whereby the movable linking means comprises a motor for conveying the movable linking means along said rails, preferably whereby said rails extend between the docking station and the receiving station along a substantially vertical axis.

The motorized movable linking means allows for fast and efficient transport of the cargo module. Note that the motor is preferably powered by mains electricity, and can be supplied with said power via the rails, to conserve the energy supplies of the aerial vehicle.

In a particularly preferred embodiment, the aerial vehicle, preferably UAV, and the home station of the methods described above, are aerial vehicles, preferably UAVs, and home stations according to the system of the invention as described in this document.

The applicant further wishes to remark that all advantages of the previously described embodiments of the cargo delivery system of the invention will naturally apply to the method of the invention as well.

The invention is further described by the following non-limiting examples which further illustrate the invention, and are not intended to, nor should they be interpreted to, limit the scope of the invention.

The present invention will be now described in more details, referring to examples that are not limitative.

EXAMPLES

Figure 1B:
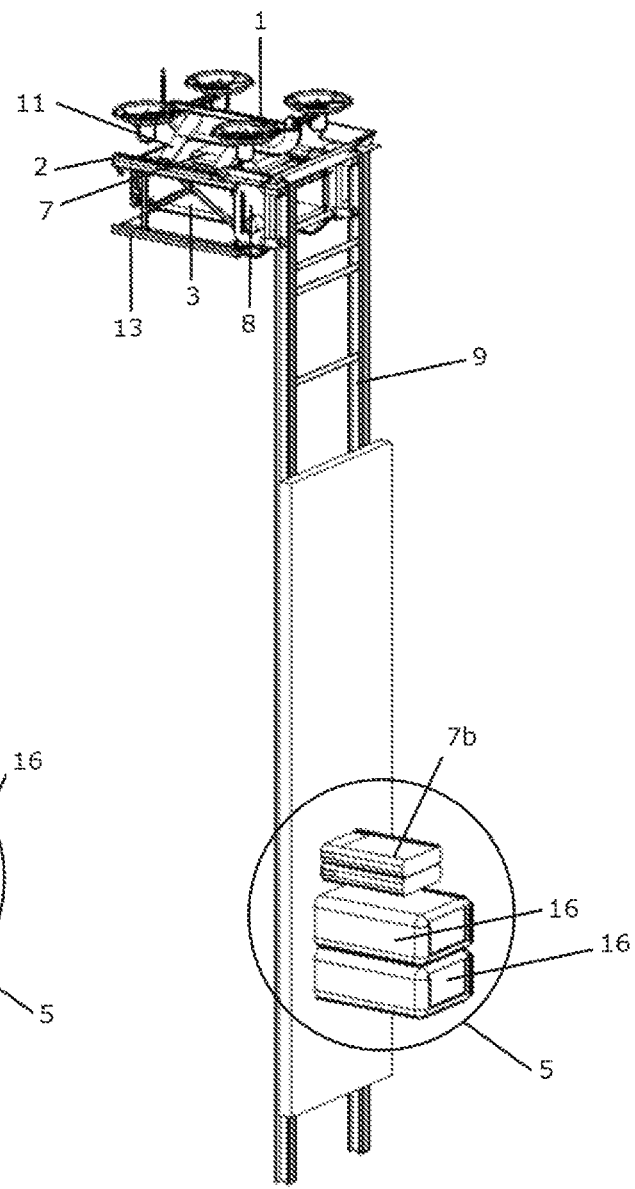

Example 1: Aerial Vehicle, Preferably UAV, is Conveyed Between Docking Station and Receiving Station FIGS. 1A-1B show a deployed home station comprising a docking station (4) and a receiving station (5) which are connected via a transport means (6) which in turn comprises a movable linking means (8) and rails (9) in this embodiment. In the docking station (4), an aerial vehicle (1), preferably a UAV, comprising a frame (2) which holds a cargo module (3), is docked. In the embodiment of the Figures, a platform (13) is comprised in the docking station (4) which platform (13) supports the aerial vehicle (1). Note however that this is an optional feature and the aerial vehicle (1) may be secured to the docking station (4) through other means as well, and preferably is so secured in addition to the platform (13). The Figures furthermore clearly show the frame (2) being connected to the aerial vehicle (1) via a connector mechanism (11). Note that in some embodiments, the connector mechanism (11) allows detachment of the frame (2) from the aerial vehicle (1). It is to be kept in mind that a connector mechanism may (instead) be present between the cargo module (3) and the frame (2) to allow detachment of the cargo module (3) from the frame (2).

In the embodiment of FIGS. 1A-1B, the movable linking means (8) is adapted to convey the entire aerial vehicle (1) with frame (2) and cargo module (3) along rails (9) which are comprised in the transport means (6). As can be seen in FIG. 1A, the receiving station (5) comprises a number of slots or receptacles (16) for receiving cargo, with said receptacles (16) comprising a door or an opening at the front. In FIG. 1B, similarly a door can be seen in the back side of the cargo module (3) through which the cargo may be exchanged with the receptacle (16). Note that extra batteries (7b) can be present as well, which can be swapped out with the battery (7) of the aerial vehicle (1).

Figure 2:
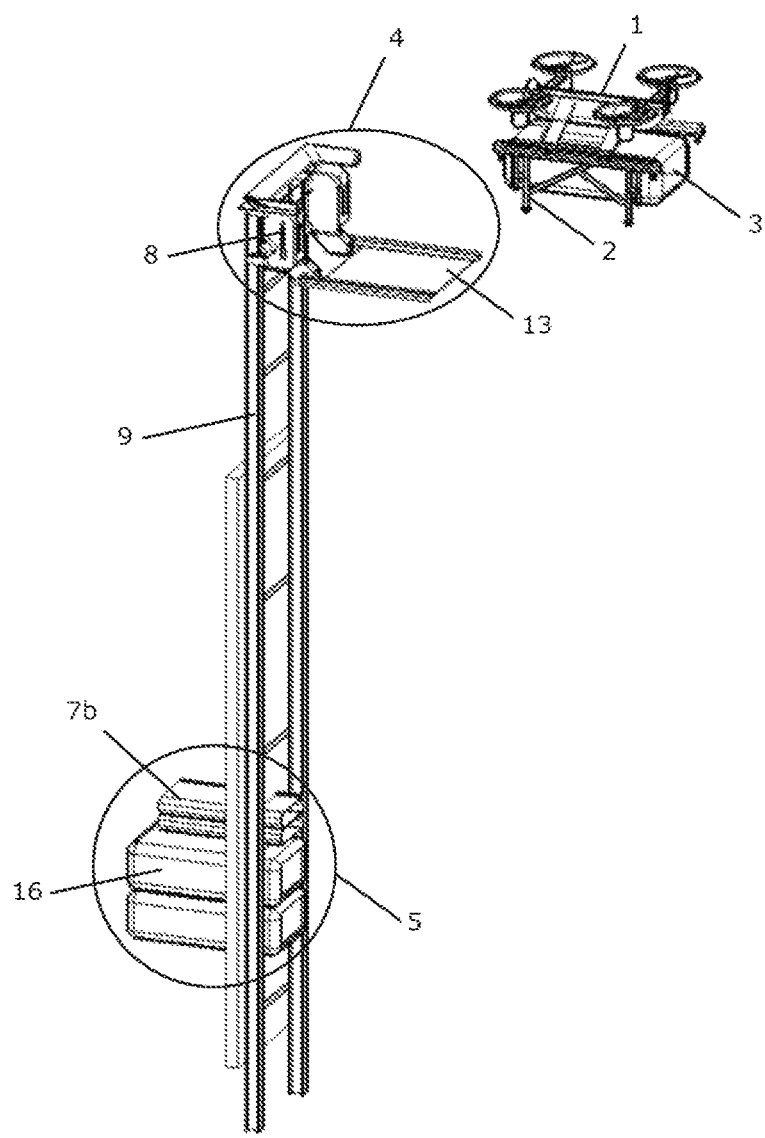
FIG. 2 shows an aerial vehicle in proximity of the docking station on a home station according to an embodiment of the invention.

In FIG. 2, an embodiment can be seen of the invention with the aerial vehicle (1) still suspended in the air close to the docking station (4), where no platform is present. In this case, another linking system will secure the aerial vehicle (1) to the docking station (4).

Figure 3A:
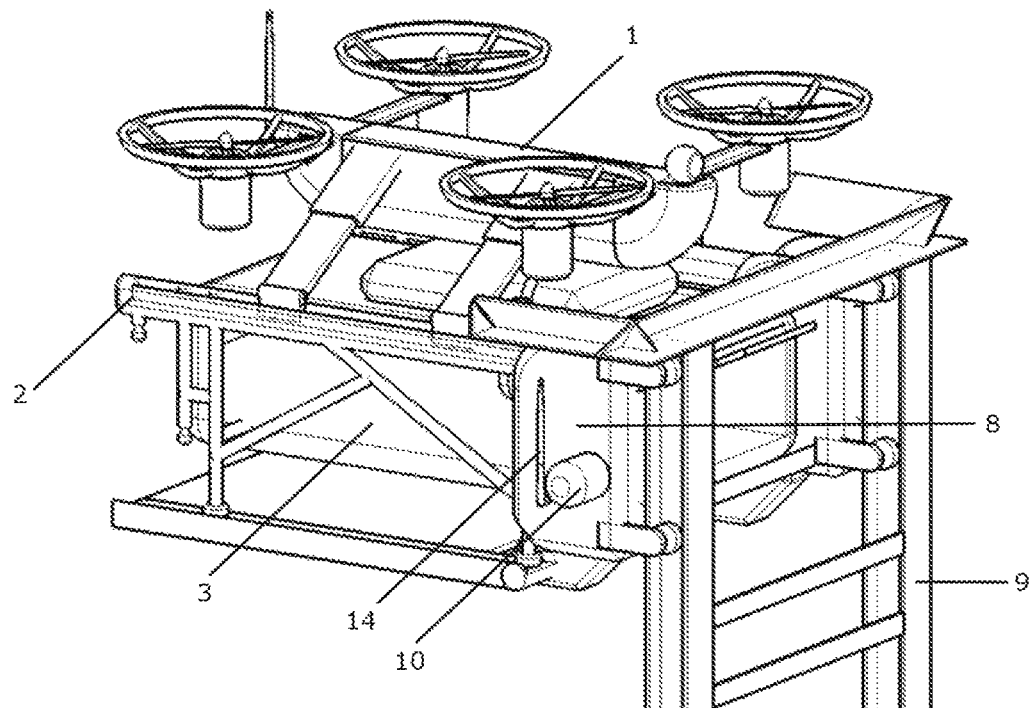
FIGS. 3A, 3B, 3C and 3D show a detailed view of a docked aerial vehicle, according to an embodiment of the invention.
Figure 3B:
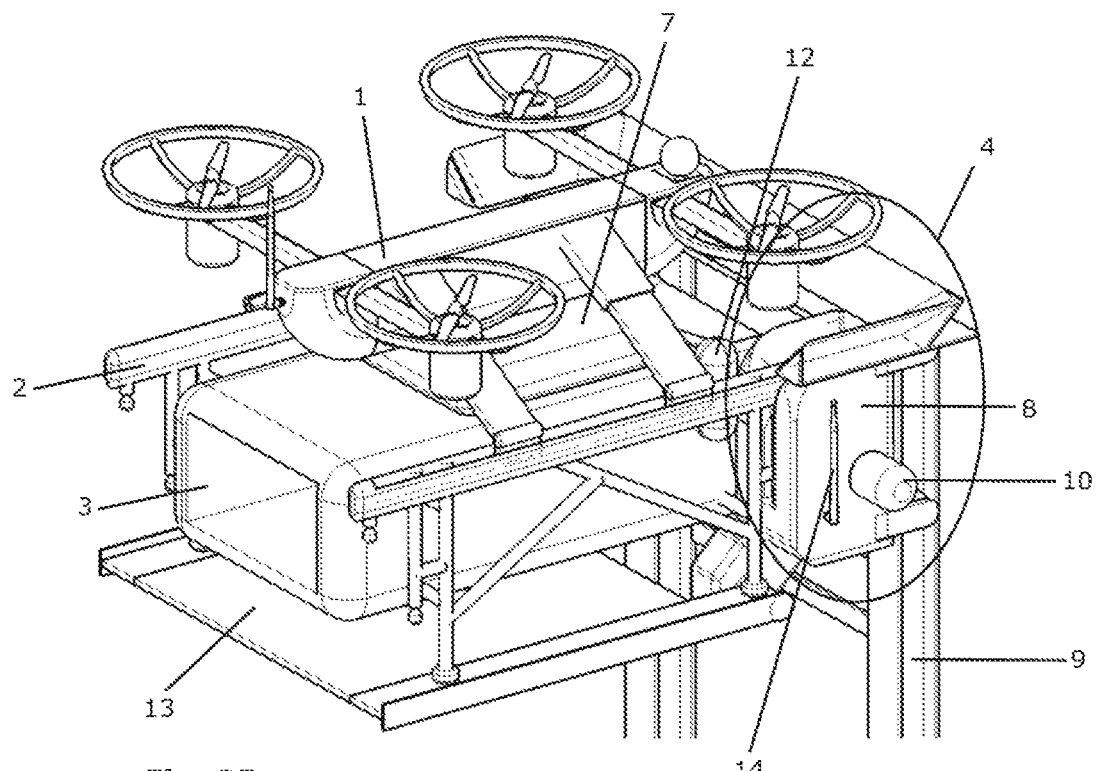
Figure 3C:
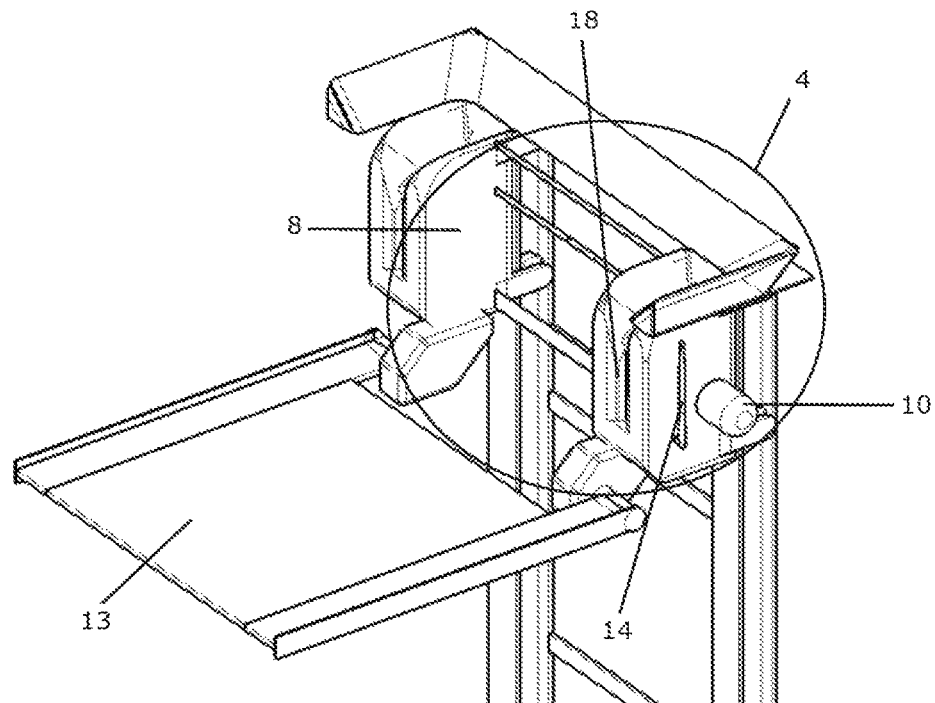
Figure 3D:
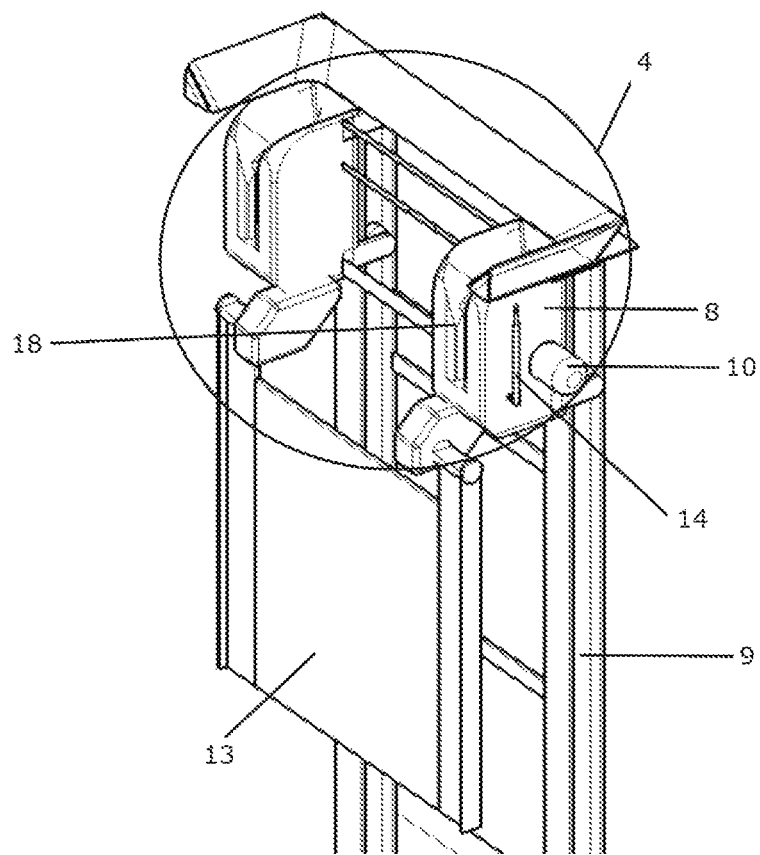

FIGS. 3A-3D show an enlarged view of the aerial vehicle (1) having docked at the docking station (4). Note that in FIG. 3A, the docking station does not comprise a landing platform (13), which is present in FIGS. 3B, 3C and 3D. The docking station (4) comprises an antenna (14) for communication with the aerial vehicle (1), and a motor (10) for executing the movement of the linking means (8) over the rails (9). Furthermore, the battery (pack) (7) is clearly visible and seen to be external to the aerial vehicle (1) itself, thereby allowing easy exchange thereof for prolonged operational time. A communication system (12) is present on the aerial vehicle (1) for communicating with the docking station (4). The docking station (4) may comprise a processor with a communication system to provide instructions to the aerial vehicle (1). Note that the platform (13) of FIGS. 3B-3D may comprise solar panels. FIG. 3D shows the possibility to fold the landing platform (13) down when no aerial vehicle (1) is docked (or trying to dock). Note that in FIG. 3C a docking means (18) is visible as well in the docking station (4), which docking means (18) is specifically adapted to receive the frame (2) as visible in FIG. 3B for instance.

FIGS. 4A, 4B, 4C and 4D in turn show possible embodiments of the cargo module (3) specifically, and how cargo may be stored in compartments (17) therein. In these embodiments, the cargo module (3) comprises a container (15) and one or more compartments (17) in the form of drawers (17) that can be slidably opened or closed into the container (15). It is possible for the drawers (17) to be transferred from the cargo module (3) to the receptacle (16) in their entirety with the cargo therein. However, alternatively as shown in FIGS. 7A, 7B, 7C and 7D, the compartments (17) have no bottom, which allows the compartments (17) to be drawn into the receptacle (16), where the cargo is withdrawn from the compartment (17). For this purpose, a ramp is either already present in the receptacle (16) or may be provided by the cargo module (for instance, slidably extendible from the cargo module (3)). After this, the compartment or drawer (17) can be placed back into the container (15) of the cargo module (3).

Figure 4A:
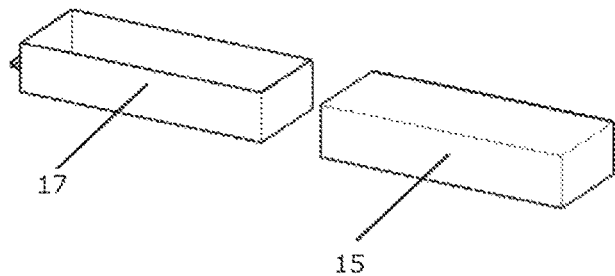
FIGS. 4A, 4B, 4C and 4D show possible embodiments for the cargo module of an aerial vehicle and compartments of said cargo module, according to an embodiment of the invention.
Figure 4A:
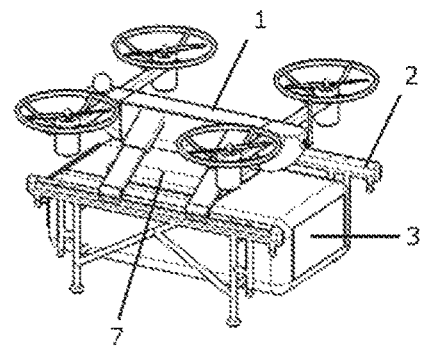
Figure 4B:
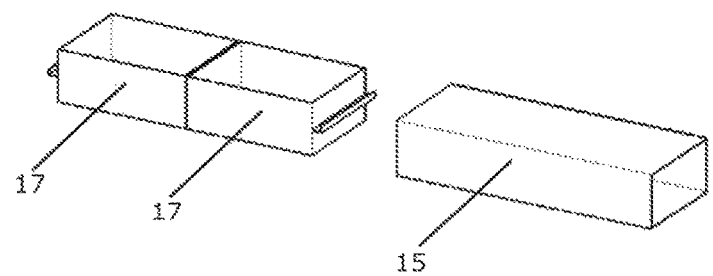
Figure 4B:
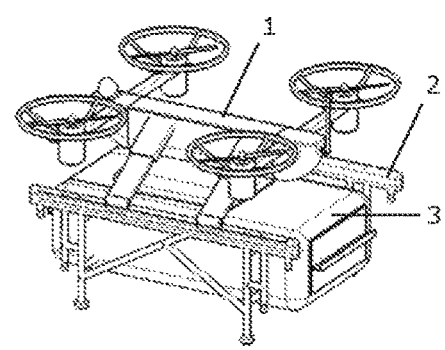
Figure 4C:
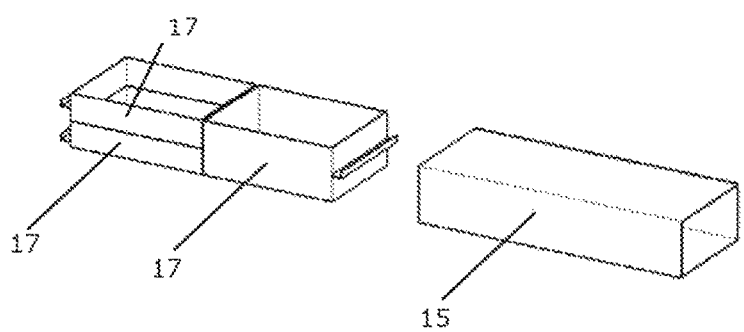
Figure 4C:
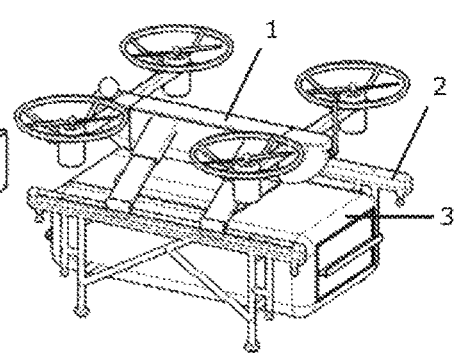
Figure 4D:
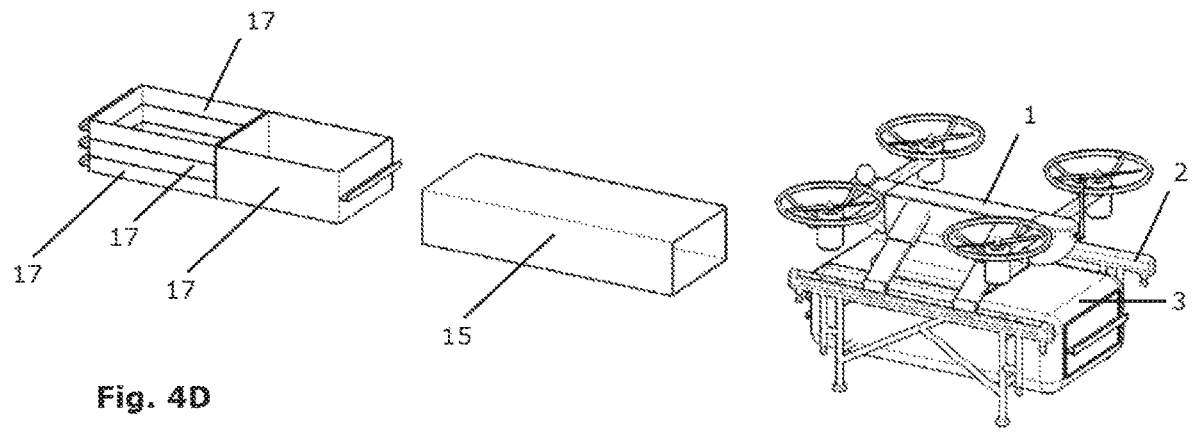

In the case of FIG. 4A, the cargo module (3) holds one container (15) in which a single compartment (17) is held. FIGS. 4B and 4C show a container (15) with two separate compartments (17), which allows withdrawal/loading of cargo through both the front and the rear of the cargo module (3). FIGS. 4D and 4E show embodiments wherein respectively two or three compartments (17) are present at one side, and a single compartment (17) at the opposite side.

Figure 5:
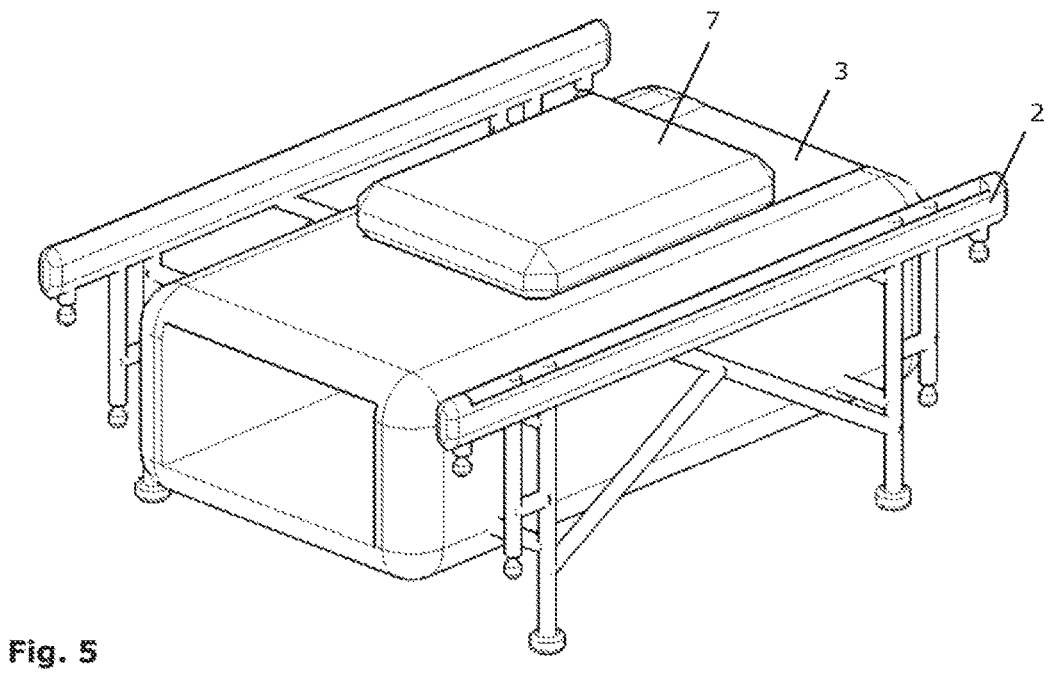
FIG. 5 shows a detailed view of the detached frame and cargo module of the aerial vehicle according to an embodiment of the invention.

FIG. 5 shows the detached frame (2) and cargo module (3) suspended therein, as well as the battery (7) of the aerial vehicle (1).

FIGS. 6A-6D shows a possible embodiment of the procedure for unloading cargo from the cargo module (3) in the situation where the entire aerial vehicle (1) is lowered to the receiving station (5). Note that this procedure may also be applied to examples 2 and 3 (and all other variations) with little adjustments. Furthermore, it is to be noted that in the FIGS. 6A-6D the rails (9), movable linking means (8), etc. are not shown to simplify the Figures and to clearly show the unloading procedure.

Figure 6A:
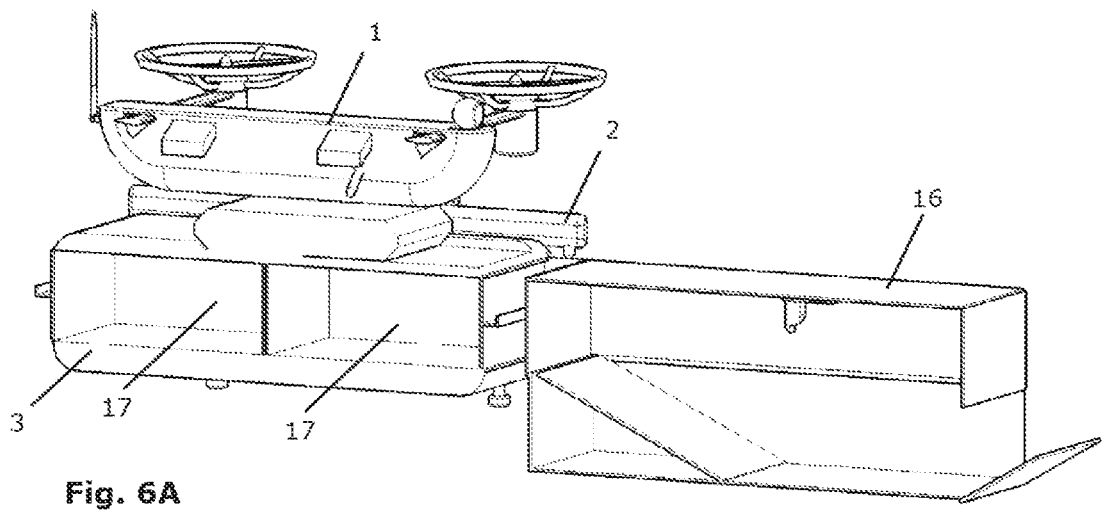
FIGS. 6A, 6B, 6C and 6D shows a possible method of withdrawing cargo from the cargo module at a home station according to an embodiment of the invention.
Figure 6B:
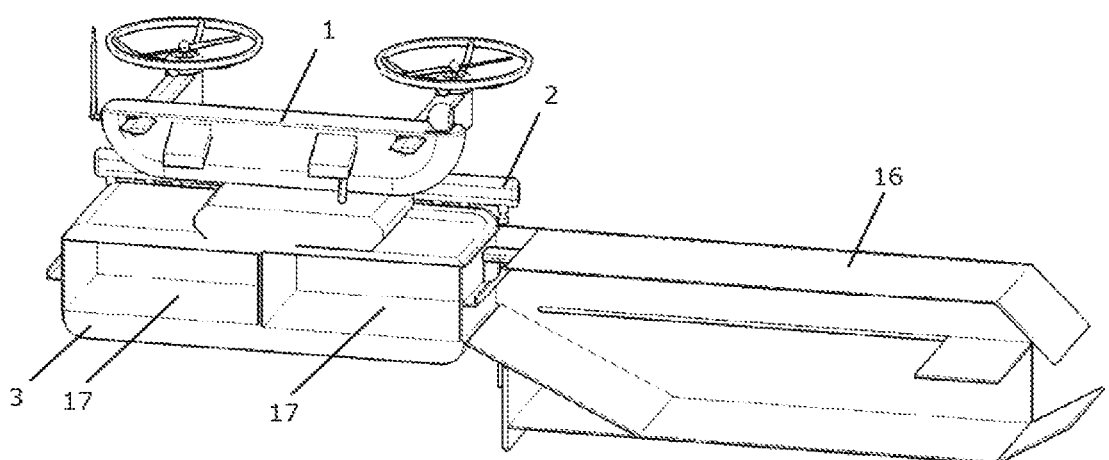
Figure 6C:
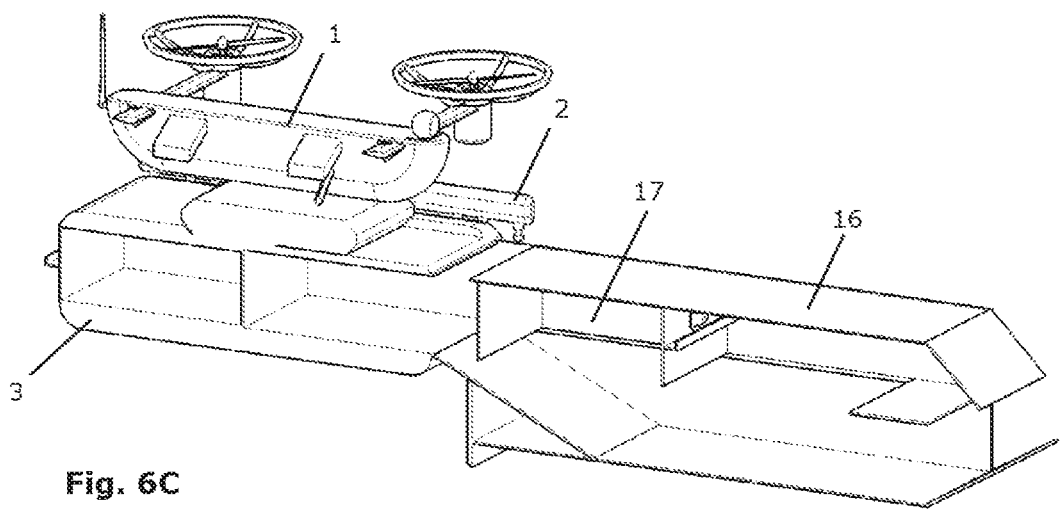
Figure 6D:
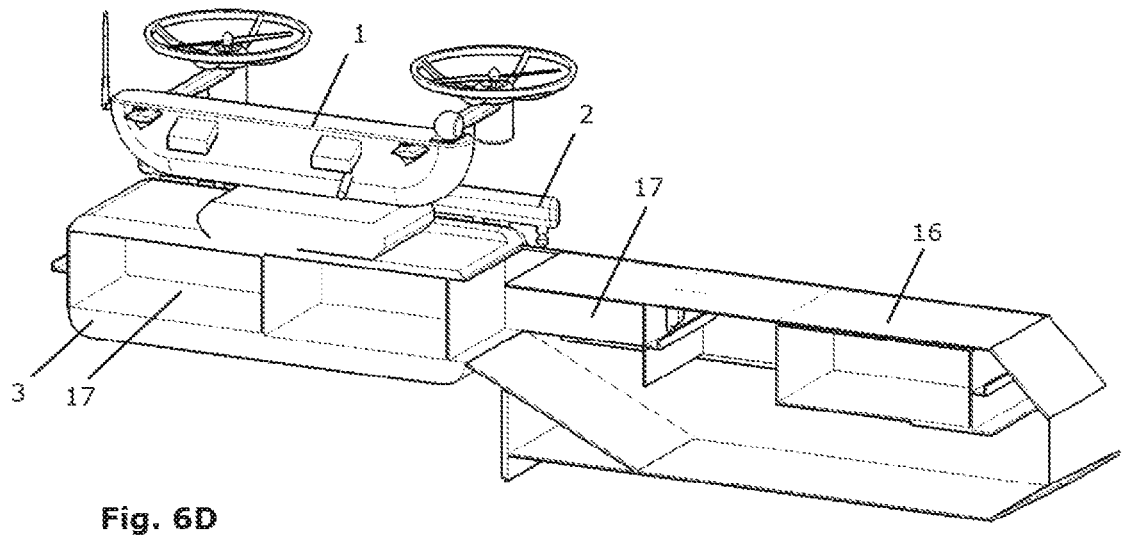

FIG. 6A shows the approach of the cargo module (3) to the receiving station (5) and specifically to a receptacle (16). These are lined up so that the opening of the cargo module (3) at a first end lines up with the receptacle (16) (which has an opening in this case covered with a slidable door). A door of the receptacle (16) opens, and a hook mechanism of the receptacle (16) moves towards the cargo module (3). Optionally, a ramp may be comprised in the receptacle (16) for cargo to descend slowly into the receptacle (16). FIG. 6B clearly shows how the hook mechanism interacts with the cargo module (3), and specifically with a compartment (17) thereof, which can be slidably retracted from the cargo module (3)). In this case, the compartment (17) has a handle onto which the hook mechanism can hold onto. Once the hook mechanism has a hold onto the compartment (17), it is again retracted into the receptacle (16) as shown in FIG. 6C, which in turn causes the compartment (17) to be retracted along with the hook mechanism, and from the cargo module (3), into the receptacle (16). Note that the compartment (17) does not have a bottom wall (alternatively, there may be a bottom wall which can be opened), so the cargo will slide along with the compartment (17) and fall into the receptacle (16) (via the ramp). While in the cargo module (3), the cargo will be supported by the container (15) (or if no container is present, by the floor of the cargo module (3)). Once the cargo is thus retrieved from the compartment (17), the hook mechanism may again push the compartment (17) back towards the cargo module (3), as shown in FIG. 6D, and into the cargo module (3), at which point the hook mechanism may disengage from the compartment (17) and retract once more.

It is of note that the system and method as described above can, in a slight variation, be made more versatile, to recognize aerial vehicles where the cargo module is detachable and aerial vehicles where it remains fixed. If the docking station recognizes a detachable type, then the movable linking means (cargo module linking means) detaches the cargo module and conveys the cargo module to the receiving station, while the aerial vehicle itself remains at the docking station. If the docking station recognizes an affixed type, the aerial vehicle with the cargo module is conveyed to the receiving station as a whole.

Example 2: Aerial Vehicle (Preferably UAV) with Detachable Cargo Module

In a second example, the system is different from that of example 1 in that the movable linking means (8) and thus the entire transport means (6) is so adapted to only convey the cargo module (3) between the docking station (4) and the receiving station (5). Obviously this may require some structural changes of the cargo module to allow a secure link between the movable linking means (8) and the cargo module, but the possibilities therein are diverse, ranging from magnetic elements to clamps to male-female connectors or combinations. Additionally, this will require the cargo module to be detachable (and preferably re-attachable) from the aerial vehicle (1) itself (and possibly from a frame (2) of the aerial vehicle (1) which holds the cargo module). The detachment is preferably automated and takes place after a signal of the docking station (4) to the aerial vehicle (1) that the aerial vehicle (1) is correctly docked (and optional further structures are in place to proceed with detachment). Reattachment may then be simply executed in the reversed manner.

Aside from these differences, the home station can be generally the same as in example 1 and may thus be described by what is shown in FIGS. 1A, 18, 2, 3A-3D and 5. With intuitive adjustments to the other Figures, the person skilled in the art can easily see the concept of this embodiment of the invention as well in the Figures, considering only a small adjustment is necessary for the cargo module (3) to be detachable from the aerial vehicle (1) itself.

Figure 7:
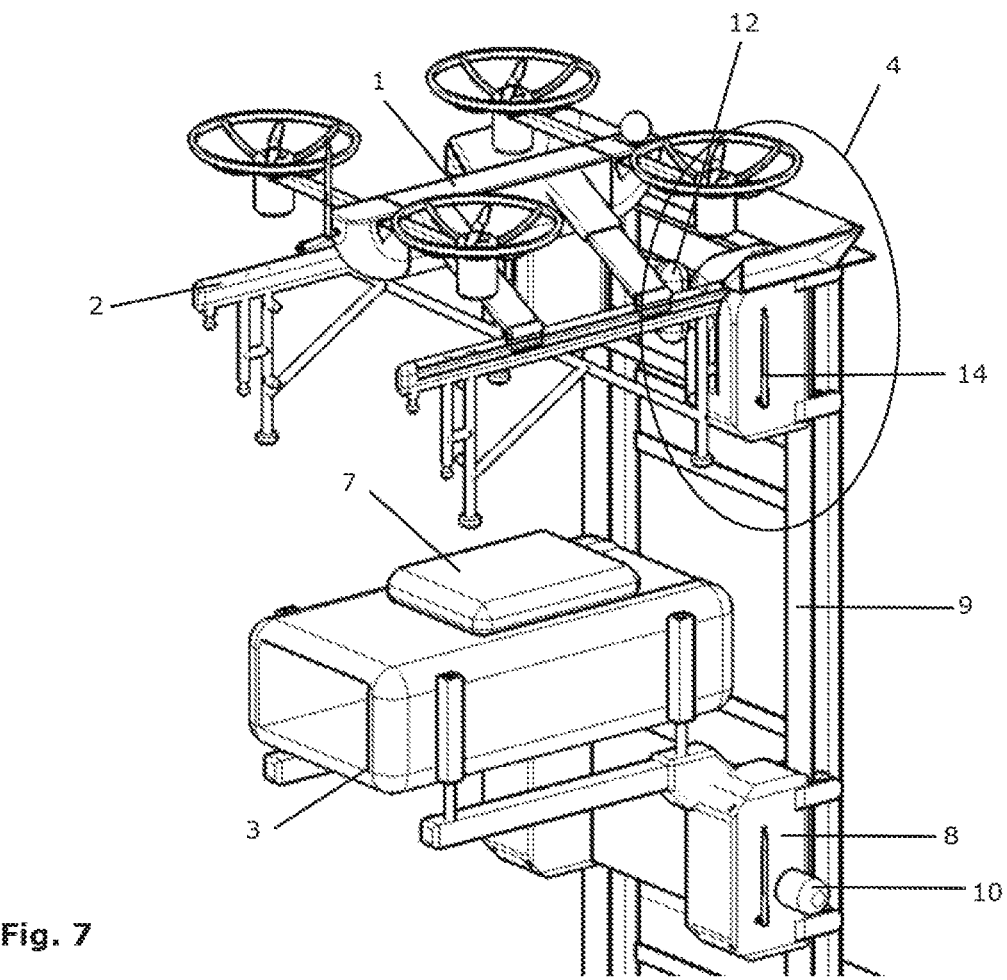
FIG. 7 shows an embodiment of the invention in which the cargo module can be detached from the UAV and is conveyed between the docking station and the receiving station.

FIG. 7 particularly shows an embodiment wherein the aerial vehicle (1) comprises a detachable cargo module (3) which is conveyed between the docking station (4) and the receiving station (5). Note how in this particular case, the movable linking means (8) comprises a set of clamps which are adapted to engage the cargo module (3).

Example 3: Aerial Vehicle (Preferably UAV) with Detachable Frame

In the third example, the system differs in that the aerial vehicle (1) comprises a frame (2) which holds the cargo module (3), and that said frame (2) is detachable (and preferably re-attachable) from the aerial vehicle (1). The detachment is preferably automated and takes place after a signal of the docking station (4) to the aerial vehicle (1) that the aerial vehicle (1) is correctly docked (and optional further structures are in place to proceed with detachment). Reattachment may then be simply executed in the reversed manner. The movable linking means (8) is adapted to link to said frame (2) and to convey the frame (2) holding the cargo module (3) between docking station (4) and receiving station (5). Again, all previous options remain open, safe that the aerial vehicle (1) stays at the docking station (4) while the frame (2) and cargo module (3) is moved. The receiving station (5) therefore will not need to be modified drastically, as the basic concept remains the same. As such, most Figures again apply, and all Figures would apply with slight modifications, to the embodiment as discussed in this third example.

Example 4: Delivery—Return Cargo

FIG. 6D also holds an optional further aspect, namely that the receptacle (16) may be equipped with a new compartment (17b) which was prepared by a sender previous to the aerial vehicle's departure from the home station. This allows the aerial vehicle (1) to make a delivery, then depart from the docking station (4), turn 180°, and re-dock. Once the cargo module (3) is conveyed to the receiving station (5) and the receptacle (16), the other side of the cargo module (3) is presented to the receptacle (16) which can then load a new compartment (17b) therein with cargo to be sent. The receptacle (16) can then also provide the necessary information to the aerial vehicle (1) (for instance, recipient, specifications of cargo, etc.). In FIG. 6D, this new compartment (17b) is visible on the right hand side of the receptacle (16).

Alternatively, the receiving station (5) may be provided with a delivery station on the side from the cargo module (3) opposite to the side of the receptacle (16). This delivery station can load a previously prepared compartment into the cargo module (3) (in a free space of the cargo module). This is especially useful when dealing with multiple 'tray' spaces in the cargo module (or in the container), as the delivery station can be adapted to automatically search for an empty space, or be directed by the aerial vehicle/cargo module itself which knows which spaces are free.

It is supposed that the present invention is not restricted to any form of realization described previously and that some modifications can be added to the presented example of fabrication without reappraisal of the appended claims. For example, the present invention has been described referring to cargo delivery, but it is clear that the invention can be applied to food or medicine delivery for instance or to document delivery, for cleaning windows or solar panel assemblies, for monitoring or guarding of structures, for repairs of structures, or even for transport of disabled aerial vehicles. Additionally, it is to be noted that the invention can easily be applied for human (and/or animal) transport as well.

The invention claimed is:
1. A system for transport of cargo and/or passengers comprising:
at least one aerial vehicle each comprising a cargo module adapted for holding the cargo and/or the passengers in one or more cargo compartments of the cargo module;

at least one home station each comprising a docking station for docking one or more of the at least one aerial vehicles;
a receiving station for receiving cargo and/or passengers, the receiving station is separated from the docking station over a distance; and
a transport means connecting the docking station and the receiving station;
wherein the docking station is adapted to physically establish a link with the at least one aerial vehicle and stably secure the link;
wherein the transport means comprises at least one rail extending between the docking station and the receiving station, the at least one rail being adapted for guiding at least the movable cargo module linking means between the docking station and the receiving station; and
wherein the system further has one of the following configurations:
(A) a first configuration wherein:
(i) the receiving station comprises a receptacle for cargo and/or passengers and is adapted to withdraw at least part of the cargo and/or the passengers from the cargo module into the receptacle when the cargo module is conveyed to the receiving station; and
(ii) the transport means is adapted for conveying the linked cargo module between the docking station and the receiving station;
or
(B) a second configuration wherein:
(i) the aerial vehicle comprises a frame for holding the cargo module, and the frame is releasably attached to the aerial vehicle;
(ii) the docking station comprises a stationary aerial vehicle linking means for establishing the link with the aerial vehicle to the docking station, and the link is not with the cargo module, the docking station being adapted to physically establish a link to the cargo module of the linked aerial vehicle, the docking station comprising a movable cargo module linking means for establishing the link with the frame to the docking station, the cargo module linking means being adapted for moving independently from the aerial vehicle linking means, and the movable cargo module linking means being adapted for detaching and attaching the frame from and to the aerial vehicle; and
(iii) the transport means is adapted for conveying the movable cargo module linking means and the linked frame and cargo module, detached from the linked aerial vehicle whereby the linked aerial vehicle is maintained stationary, between the docking station and the receiving station.

2. The system for transport of cargo and/or passengers according to claim 1, wherein each of the at least one aerial vehicle comprises a frame for holding the cargo module, the frame being releasably attached to the aerial vehicle, the docking station comprising a stationary aerial vehicle linking means for establishing the link with the aerial vehicle to the docking station, and the link is not with the cargo module, the docking station is adapted to physically establish a link to the cargo module of the linked aerial vehicle, the docking station comprises a movable cargo module linking means for establishing the link with the frame to the docking station, the cargo module linking means is adapted for moving independently from the aerial vehicle linking means, and the movable cargo module linking means is adapted for detaching and attaching the frame from and to the aerial vehicle, the transport means is adapted for conveying the movable cargo module linking means and the linked frame and cargo module, detached from the linked aerial vehicle so that the linked aerial vehicle is maintained stationary, between the docking station and the receiving station, the docking station comprising a landing platform for the aerial vehicle to land on, and the stationary aerial vehicle linking means comprises at least one magnet for lining up the aerial vehicle with the docking station.

3. The system for transport of cargo and/or passengers according to claim 1, wherein the cargo module comprises at least one compartment for holding cargo and/or passengers, which compartment can be removed from and inserted into the cargo module, the receiving station is adapted to remove and insert compartments from and in the cargo module.

4. The system for transport of cargo and/or passengers according to claim 1, wherein the docking station comprises a stationary aerial vehicle linking means for establishing the link with the at least one aerial vehicle to the docking station, and the transport means comprises a movable linking means for establishing a link with the cargo module to the transport means, the movable linking means being adapted for detaching and attaching the cargo module to the at least one aerial vehicle, and the transport means being adapted for conveying the movable linking means and the detached cargo module between the docking station and the receiving station.

5. The system for transport of cargo and/or passengers according to claim 1, wherein the at least one aerial vehicle comprises a frame for holding the cargo module, the frame is releasably attached to the aerial vehicle, the docking station comprises a stationary aerial vehicle linking means for establishing the link with the aerial vehicle to the docking station, and the linking means further comprises a movable linking means for establishing a link with the frame to the transport means, the movable linking means being adapted for detaching and attaching the frame to the aerial vehicle, and the transport means is adapted for conveying the movable linking means and the detached frame between the docking station and the receiving station.

6. The system for transport of cargo and/or passengers according to claim 1, wherein the movable cargo module linking means comprises a motor for conveying the cargo module linking means along the at least one rail.

7. The system for transport of cargo and/or passengers according to claim 6, wherein each of the at least one aerial vehicle comprises a frame for holding the cargo module, the frame being releasably attached to the aerial vehicle, the docking station comprising a stationary aerial vehicle linking means for establishing the link with the aerial vehicle to the docking station, and the link is not with the cargo module, the docking station is adapted to physically establish a link to the cargo module of the linked aerial vehicle, the docking station comprises a movable cargo module linking means for establishing the link with the frame to the docking station, the cargo module linking means is adapted for moving independently from the aerial vehicle linking means, and the movable cargo module linking means is adapted for detaching and attaching the frame from and to the aerial vehicle, the transport means is adapted for conveying the movable cargo module linking means and the linked frame and cargo module, detached from the linked aerial vehicle so that the linked aerial vehicle is maintained stationary, between the docking station and the receiving station, the docking station comprising a landing platform for the aerial vehicle to land on, and the stationary aerial vehicle linking means comprises at least one magnet for lining up the aerial vehicle with the docking station.

8. The system for transport of cargo and/or passengers according to claim 6, wherein the cargo module comprises at least one compartment for holding cargo and/or passengers, which compartment can be removed from and inserted into the cargo module, the receiving station is adapted to remove and insert compartments from and in the cargo module.

9. The system for transport of cargo and/or passengers according to claim 6, wherein the docking station comprises a stationary aerial vehicle linking means for establishing the link with the at least one aerial vehicle to the docking station, and the transport means comprises a movable linking means for establishing a link with the cargo module to the transport means, the movable linking means being adapted for detaching and attaching the cargo module to the at least one aerial vehicle, and the transport means being adapted for conveying the movable linking means and the detached cargo module between the docking station and the receiving station.

10. The system for transport of cargo and/or passengers according to claim 6, wherein the at least one aerial vehicle comprises a frame for holding the cargo module, the frame is releasably attached to the aerial vehicle, the docking station comprises a stationary aerial vehicle linking means for establishing the link with the aerial vehicle to the docking station, and the linking means further comprises a movable linking means for establishing a link with the frame to the transport means, the movable linking means being adapted for detaching and attaching the frame to the aerial vehicle, and the transport means is adapted for conveying the movable linking means and the detached frame between the docking station and the receiving station.

11. A system for transport of cargo and/or passengers comprising:
at least one aerial vehicle each comprising a cargo module adapted for holding the cargo and/or the passengers in one or more cargo compartments of the cargo module;
at least one home station comprising a docking station for docking the at least one aerial vehicles;
a receiving station for receiving cargo and/or passengers, the receiving station being separated from the docking station over a distance; and
a transport means connecting the docking station and the receiving station;
wherein the docking station is adapted to physically establish a link with the at least one aerial vehicle and stably secure the link;
wherein the docking station comprises a processor, the processor comprising a wireless communication module adapted to communicate with the at least one aerial vehicle and to provide the at least one aerial vehicle with instructions from the processor; and
wherein the system further has one of the following configurations:
(A) a first configuration wherein:
(i) the receiving station comprises a receptacle for cargo and/or passengers and is adapted to withdraw at least part of the cargo and/or the passengers from the cargo module into the receptacle when the cargo module is conveyed to the receiving station; and
(ii) the transport means is adapted for conveying the linked cargo module between the docking station and the receiving station;
or
(B) a second configuration wherein:
(i) the aerial vehicle comprises a frame for holding the cargo module, and the frame is releasably attached to the aerial vehicle;
(ii) the docking station comprises a stationary aerial vehicle linking means for establishing the link with the aerial vehicle to the docking station, and the link is not with the cargo module, the docking station being adapted to physically establish a link to the cargo module of the linked aerial vehicle, the docking station comprising a movable cargo module linking means for establishing the link with the frame to the docking station, the cargo module linking means being adapted for moving independently from the aerial vehicle linking means, and the movable cargo module linking means being adapted for detaching and attaching the frame from and to the aerial vehicle; and
(iii) the transport means is adapted for conveying the movable cargo module linking means and the linked frame and cargo module, detached from the linked aerial vehicle whereby the linked aerial vehicle is maintained stationary, between the docking station and the receiving station.

12. The system for transport of cargo and/or passengers according to claim 11, wherein each of the at least one aerial vehicle comprises a frame for holding the cargo module, the frame being releasably attached to the aerial vehicle, the docking station comprising a stationary aerial vehicle linking means for establishing the link with the aerial vehicle to the docking station, and the link is not with the cargo module, the docking station is adapted to physically establish a link to the cargo module of the linked aerial vehicle, the docking station comprises a movable cargo module linking means for establishing the link with the frame to the docking station, the cargo module linking means is adapted for moving independently from the aerial vehicle linking means, and the movable cargo module linking means is adapted for detaching and attaching the frame from and to the aerial vehicle, the transport means is adapted for conveying the movable cargo module linking means and the linked frame and cargo module, detached from the linked aerial vehicle so that the linked aerial vehicle is maintained stationary, between the docking station and the receiving station, the docking station comprising a landing platform for the aerial vehicle to land on, and the stationary aerial vehicle linking means comprises at least one magnet for lining up the aerial vehicle with the docking station.

13. The system for transport of cargo and/or passengers according to claim 11, wherein the cargo module comprises at least one compartment for holding cargo and/or passengers, which compartment can be removed from and inserted into the cargo module, the receiving station is adapted to remove and insert compartments from and in the cargo module.

14. The system for transport of cargo and/or passengers according to claim 11, wherein the docking station comprises a stationary aerial vehicle linking means for establishing the link with the at least one aerial vehicle to the docking station, and the transport means comprises a movable linking means for establishing a link with the cargo module to the transport means, the movable linking means being adapted for detaching and attaching the cargo module to the at least one aerial vehicle, and the transport means being adapted for conveying the movable linking means and the detached cargo module between the docking station and the receiving station.

15. The system for transport of cargo and/or passengers according to claim 11, wherein the at least one aerial vehicle comprises a frame for holding the cargo module, the frame is releasably attached to the aerial vehicle, the docking station comprises a stationary aerial vehicle linking means for establishing the link with the aerial vehicle to the docking station, and the linking means further comprises a movable linking means for establishing a link with the frame to the transport means, the movable linking means being adapted for detaching and attaching the frame to the aerial vehicle, and the transport means is adapted for conveying the movable linking means and the detached frame between the docking station and the receiving station.

16. A system for transport of cargo and/or passengers comprising:
- at least one aerial vehicle each comprising a cargo module adapted for holding the cargo and/or the passengers in one or more cargo compartments of the cargo module;
- at least one home station each comprising a docking station for docking one or more of the at least one aerial vehicles;
- a receiving station for receiving cargo and/or passengers, the receiving station is separated from the docking station over a distance; and
- a transport means connecting the docking station and the receiving station;
- wherein the docking station is adapted to physically establish a link with the at least one aerial vehicle and stably secure the link;
- wherein the receiving station comprises a bay for holding one or more mobile frames upon which mobile frames the cargo module is to be attached;
- wherein the system further has one of the following configurations:
  - (A) a first configuration wherein:
    - (i) the receiving station comprises a receptacle for cargo and/or passengers and is adapted to withdraw at least part of the cargo and/or the passengers from the cargo module into the receptacle when the cargo module is conveyed to the receiving station; and
    - (ii) the transport means is adapted for conveying the linked cargo module between the docking station and the receiving station;
  - or
  - (B) a second configuration wherein:
    - (i) the aerial vehicle comprises a frame for holding the cargo module, and the frame is releasably attached to the aerial vehicle;
    - (ii) the docking station comprises a stationary aerial vehicle linking means for establishing the link with the aerial vehicle to the docking station, and the link is not with the cargo module, the docking station being adapted to physically establish a link to the cargo module of the linked aerial vehicle, the docking station comprising a movable cargo module linking means for establishing the link with the frame to the docking station, the cargo module linking means being adapted for moving independently from the aerial vehicle linking means, and the movable cargo module linking means being adapted for detaching and attaching the frame from and to the aerial vehicle;
    - (iii) the transport means is adapted for conveying the movable cargo module linking means and the linked frame and cargo module, detached from the linked aerial vehicle whereby the linked aerial vehicle is maintained stationary, between the docking station and the receiving station; and
    - (iv) the frame holding the cargo module can be attached upon the mobile frames.

17. The system for transport of cargo and/or passengers according to claim 16, wherein each of the at least one aerial vehicle comprises a frame for holding the cargo module, the frame being releasably attached to the aerial vehicle, the docking station comprising a stationary aerial vehicle linking means for establishing the link with the aerial vehicle to the docking station, and the link is not with the cargo module, the docking station is adapted to physically establish a link to the cargo module of the linked aerial vehicle, the docking station comprises a movable cargo module linking means for establishing the link with the frame to the docking station, the cargo module linking means is adapted for moving independently from the aerial vehicle linking means, and the movable cargo module linking means is adapted for detaching and attaching the frame from and to the aerial vehicle, the transport means is adapted for conveying the movable cargo module linking means and the linked frame and cargo module, detached from the linked aerial vehicle so that the linked aerial vehicle is maintained stationary, between the docking station and the receiving station, the docking station comprising a landing platform for the aerial vehicle to land on, and the stationary aerial vehicle linking means comprises at least one magnet for lining up the aerial vehicle with the docking station.

18. The system for transport of cargo and/or passengers according to claim 16, wherein the cargo module comprises at least one compartment for holding cargo and/or passengers, which compartment can be removed from and inserted into the cargo module, the receiving station is adapted to remove and insert compartments from and in the cargo module.

19. The system for transport of cargo and/or passengers according to claim 16, wherein the docking station comprises a stationary aerial vehicle linking means for establishing the link with the at least one aerial vehicle to the docking station, and the transport means comprises a movable linking means for establishing a link with the cargo module to the transport means, the movable linking means being adapted for detaching and attaching the cargo module to the at least one aerial vehicle, and the transport means being adapted for conveying the movable linking means and the detached cargo module between the docking station and the receiving station.

20. The system for transport of cargo and/or passengers according to claim 16, wherein the at least one aerial vehicle comprises a frame for holding the cargo module, the frame is releasably attached to the aerial vehicle, the docking station comprises a stationary aerial vehicle linking means for establishing the link with the aerial vehicle to the docking station, and the linking means further comprises a movable linking means for establishing a link with the frame to the transport means, the movable linking means being adapted for detaching and attaching the frame to the aerial vehicle, and the transport means is adapted for conveying the movable linking means and the detached frame between the docking station and the receiving station.

21. A system for transport of cargo and/or passengers comprising:
- at least one aerial vehicle each comprising a cargo module, preferably releasably attached to the respective aerial vehicle, adapted for holding the cargo and/or the passengers in one or more cargo compartments of the cargo module;

at least one home station each comprising a docking station for docking one or more of the at least one aerial vehicles;

a receiving station for receiving cargo and/or passengers, the receiving station is separated from the docking station over a distance; and a transport means connecting the docking station and the receiving station;

wherein the docking station is adapted to physically establish a link with the at least one aerial vehicle and stably secure the link;

wherein the receiving station comprises a receptacle for cargo and/or passengers and is adapted to withdraw at least part of the cargo and/or the passengers from the cargo module into the receptacle when the cargo module is conveyed to the receiving station;

wherein the transport means is adapted for conveying at least the linked cargo module of a linked aerial vehicle between the docking station and the receiving station; and wherein the transport means comprises movable linking means, the movable linking means comprising an aerial vehicle linking means for establishing a link with the aerial vehicle to the transport means, and whereby the transport means is adapted for conveying the aerial vehicle linking means and the at least one aerial vehicle with the cargo module between the docking station and the receiving station.

22. The system for transport of cargo and/or passengers according to claim 21, wherein each of the at least one aerial vehicle comprises a frame for holding the cargo module, the frame being releasably attached to the aerial vehicle, the docking station comprising a stationary aerial vehicle linking means for establishing the link with the aerial vehicle to the docking station, and the link is not with the cargo module, the docking station is adapted to physically establish a link to the cargo module of the linked aerial vehicle, the docking station comprises a movable cargo module linking means for establishing the link with the frame to the docking station, the cargo module linking means is adapted for moving independently from the aerial vehicle linking means, and the movable cargo module linking means is adapted for detaching and attaching the frame from and to the aerial vehicle, the transport means is adapted for conveying the movable cargo module linking means and the linked frame and cargo module, detached from the linked aerial vehicle so that the linked aerial vehicle is maintained stationary, between the docking station and the receiving station, the docking station comprising a landing platform for the aerial vehicle to land on, and the stationary aerial vehicle linking means comprises at least one magnet for lining up the aerial vehicle with the docking station.

23. The system for transport of cargo and/or passengers according to claim 21, wherein the cargo module comprises at least one compartment for holding cargo and/or passengers, which compartment can be removed from and inserted into the cargo module, the receiving station is adapted to remove and insert compartments from and in the cargo module.

24. The system for transport of cargo and/or passengers according to claim 21, wherein the docking station comprises a stationary aerial vehicle linking means for establishing the link with the at least one aerial vehicle to the docking station, and the transport means comprises a movable linking means for establishing a link with the cargo module to the transport means, the movable linking means being adapted for detaching and attaching the cargo module to the at least one aerial vehicle, and the transport means being adapted for conveying the movable linking means and the detached cargo module between the docking station and the receiving station.

25. The system for transport of cargo and/or passengers according to claim 21, wherein the at least one aerial vehicle comprises a frame for holding the cargo module, the frame is releasably attached to the aerial vehicle, the docking station comprises a stationary aerial vehicle linking means for establishing the link with the aerial vehicle to the docking station, and the linking means further comprises a movable linking means for establishing a link with the frame to the transport means, the movable linking means being adapted for detaching and attaching the frame to the aerial vehicle, and the transport means is adapted for conveying the movable linking means and the detached frame between the docking station and the receiving station.

26. A method of transporting cargo and/or passengers using an aerial vehicle from and to a home station, the aerial vehicle comprising a cargo module releasably attached to the aerial vehicle, the cargo module being adapted for holding the cargo and/or the passengers in one or more cargo compartments of the cargo module, the home station comprising a docking station for docking at least one aerial vehicle, a receiving station adapted for receiving cargo and/or passengers and being separated from the docking station over a distance, the method comprising:

using the aerial vehicle to approach the home station;

docking the aerial vehicle in the docking station;

physically establishing a link between the docking station and the aerial vehicle by docking and stably securing said link;

physically establishing a link to the cargo module of the linked aerial vehicle;

detaching the cargo module from the aerial vehicle;

conveying the linked cargo module of the linked aerial vehicle from the docking station to the receiving station;

transferring the cargo and/or passengers respectively to the cargo module from the receiving station or from the cargo module to the receiving station; and wherein the method further comprises one of the following:

(A) the home station comprises a stationary aerial vehicle linking means for establishing the physical link with the aerial vehicle to the docking station, and the home station comprises a movable linking means for establishing a link to the cargo module, the movable linking means being adapted for conveying the linked cargo module between the docking station and the receiving station;

or (B) the aerial vehicle comprises a frame, the frame being releasably attached to the aerial vehicle, and the frame being adapted for holding the cargo module, the home station comprising a stationary aerial vehicle linking means for establishing the physical link with the aerial vehicle to the docking station, the home station comprising a movable linking means for establishing a link to the frame holding the cargo module, and the movable linking means being adapted for conveying the linked frame between the docking station and the receiving station;

or (C) the docking station comprises a movable linking means adapted for establishing a physical link to the aerial vehicle comprising the cargo module, the movable linking means being adapted for conveying the aerial vehicle and the cargo module thereof, between the docking station and the receiving station.

27. The method according to claim 26, wherein, before conveying the linked cargo module of the linked aerial vehicle from the docking station to the receiving station, the method further comprises detaching the cargo module from the aerial vehicle;

wherein the method further comprising:

conveying the linked cargo module of the linked aerial vehicle from the receiving station to the docking station;

after conveying the linked cargo module of the linked aerial vehicle from the receiving station to the docking station, attaching the cargo module to the aerial vehicle.

28. The method according to claim 26, wherein the aerial vehicle comprises a frame, the frame being releasably attached to the aerial vehicle, and the frame being adapted for holding the cargo module, the home station comprising a stationary aerial vehicle linking means for establishing the physical link with the aerial vehicle to the docking station, the home station comprising a movable linking means for establishing a link to the frame holding the cargo module, and the movable linking means being adapted for conveying the linked frame between the docking station and the receiving station, the method further comprising:

before conveying the linked frame holding the cargo module of the linked aerial vehicle from the docking station to the receiving station, detaching the frame holding the cargo module from the aerial vehicle;

and the method further comprising, after conveying the linked cargo module of a linked aerial vehicle from the receiving station to the docking station, attaching the frame holding the cargo module to the aerial vehicle.

29. The method according to claim 26, wherein the aerial vehicle comprises a frame for holding the cargo module, the cargo module linking means being adapted to establish a link to the frame holding the cargo module, the detaching of the cargo module from the aerial vehicle is effected by detaching the frame holding the cargo module from the aerial vehicle, and the attaching of the cargo module to the aerial vehicle is effected by attaching the frame holding the cargo module to the aerial vehicle, the cargo module linking means conveying the frame holding the cargo module between the docking station and the receiving station.

30. The method according to claim 26, wherein the home station comprises a cargo module linking means adapted to establish a link to the cargo module, the home station comprising at least one rail extending between the docking station and the receiving station, the cargo module linking means being conveyed along the at least one rail between the docking station and the receiving station, and the cargo module linking means comprising a motor for conveying the cargo module linking means along the at least one rail.

31. The method according to claim 26, further comprising:

providing at least one mobile frame to the receiving station, the mobile frame being capable of motorized transportation; and attaching the cargo module to the mobile frame, allowing for transportation of the cargo module via the mobile frame.

32. A method of transporting cargo and/or passengers using an aerial vehicle from and to a home station, the aerial vehicle comprising a cargo module releasably attached to the aerial vehicle, the cargo module being adapted for holding the cargo and/or the passengers in at least one cargo compartment of the cargo module, the home station comprising a docking station for docking at least one aerial vehicle, and a receiving station being adapted for receiving cargo and/or passengers and which is separated from the docking station over a distance, the method comprising:

using the aerial vehicle to approach the home station;

docking the aerial vehicle in the docking station;

physically establishing a link between the docking station and the aerial vehicle by docking and stably securing said link;

physically establishing a link to the cargo module of the linked aerial vehicle;

detaching the cargo module from the aerial vehicle;

conveying the linked cargo module of the linked aerial vehicle from the docking station to the receiving station;

transferring the cargo and/or passengers respectively to the cargo module from the receiving station or from the cargo module to the receiving station; and wherein the home station comprises at least one rail extending between the docking station and the receiving station along a substantially vertical axis, the movable linking means being conveyed along the at least one rail between the docking station and the receiving station.

33. The method according to claim 32, wherein the home station comprises a cargo module linking means adapted to establish a link to the cargo module, the home station comprising at least one rail extending between the docking station and the receiving station, the cargo module linking means being conveyed along the at least one rail between the docking station and the receiving station, and the cargo module linking means comprising a motor for conveying the cargo module linking means along the at least one rail.

34. The method according to claim 32, further comprising:

providing at least one mobile frame to the receiving station, the mobile frame being capable of motorized transportation; and attaching the cargo module to the mobile frame, allowing for transportation of the cargo module via the mobile frame.

* * * * *